(12) United States Patent
Xin et al.

(10) Patent No.: US 11,950,317 B2
(45) Date of Patent: Apr. 2, 2024

(54) ROAMING DATA PROCESSING METHOD, APPARATUS, AND SYSTEM

(71) Applicant: HUAWEI TECHNOLOGIES CO., LTD., Guangdong (CN)

(72) Inventors: Yang Xin, Shanghai (CN); Yongcui Li, Beijing (CN); Weiwei Chong, Shenzhen (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/491,681

(22) Filed: Oct. 1, 2021

(65) Prior Publication Data

US 2022/0022027 A1    Jan. 20, 2022

Related U.S. Application Data

(63) Continuation of application No. PCT/CN2020/078857, filed on Mar. 11, 2020.

(30) Foreign Application Priority Data

Apr. 8, 2019    (CN) .......................... 201910277936.1

(51) Int. Cl.
*H04W 12/69* (2021.01)
*H04W 8/04* (2009.01)
(Continued)

(52) U.S. Cl.
CPC ............. *H04W 8/12* (2013.01); *H04W 8/183* (2013.01); *H04W 8/20* (2013.01); *H04W 84/042* (2013.01)

(58) Field of Classification Search
None
See application file for complete search history.

(56) References Cited

U.S. PATENT DOCUMENTS

2018/0352050 A1    12/2018    Li et al.

FOREIGN PATENT DOCUMENTS

| CN | 101621780 A | 1/2010 |
|---|---|---|
| CN | 102833721 A | 12/2012 |

(Continued)

OTHER PUBLICATIONS

3GPP TS 23.288, V0.3.0, "3rd Generation Partnership Project; Technical Specification Group Services and System Aspects; Architecture enhancements for 5G System (SGS) to support network data analytics services (Release 16)", pp. 1-44, XP051722831.

(Continued)

*Primary Examiner* — Gary Lafontant

(57) ABSTRACT

Embodiments of this application relate to the field of communication technologies, and in particular, to a roaming data processing method and apparatus, and a system. The method is used to effectively collect data of a terminal in a roaming scenario. The method includes a first data analytics network element receiving, from a visited first network element, data of a terminal on the first network element, where the data includes first information and a first identifier, the first information is used to indicate that the terminal is roaming, and the first information includes any one or more of the following information corresponding to the terminal: a home PLMN identifier, a visited PLMN identifier, home area information, and visited area information.

20 Claims, 16 Drawing Sheets

(51) Int. Cl.
  *H04W 8/12* (2009.01)
  *H04W 8/18* (2009.01)
  *H04W 8/20* (2009.01)
  *H04W 84/04* (2009.01)

(56) References Cited

FOREIGN PATENT DOCUMENTS

| CN | 102868988 A | 1/2013 | | |
|---|---|---|---|---|
| CN | 105554851 A | 5/2016 | | |
| CN | 106504099 A | 3/2017 | | |
| CN | 108260167 A | 7/2018 | | |
| WO | WO-2017039187 A1 * | 3/2017 | ............ | H04L 12/12 |
| WO | 2019032968 A1 | 2/2019 | | |

OTHER PUBLICATIONS

3GPP TS 23.501, V16.0.2,Anonymous: "3rd Generation Partnership Project; Technical Specification Group Services and System Aspects; System Architecture for the 5G System; Stage 2 (Release 16)", Apr. 1, 2019 (Apr. 1, 2019), pp. 1-317, XPOS 1723245.

3GPP TS 23.502, V16.0.2,Anonymous: "3rd Generation Partnership Project; Technical Specification Group Services and System Aspects; Procedures for the 5G System; Stage 2 (Release 16)", Apr. 1, 2019 (Apr. 1, 2019), pp. 1-419, XP051723248.

European Search Report for Application No. 20786713.6 dated Mar. 18, 2022, 12 pages.

3GPP TS 23.003 V15.6.0 (Dec. 2018), 3rd Generation Partnership Project; Technical Specification Group Core Network and Terminals; Numbering, addressing and identification (Release 15), 130 pages.

3GPP TS 23.501 V16.0.2 (Apr. 2019); 3rd Generation Partnership Project; Technical Specification Group Services and System Aspects;System Architecture for the 5G System; Stage 2 (Release 16); total 317 pages.

3GPP TS 23.502 V16.0.2 (Apr. 2019); 3rd Generation Partnership Project; Technical Specification Group Services and System Aspects; Procedures for the 5G System; Stage 2 (Release 16); total 419 pages.

International Search Report and Written Opinion issued in PCT/CN2020/078857, dated May 27, 2020, 9 pages.

Office Action issued in CN201910277936.1, dated Feb. 3, 2021, 7 pages.

* cited by examiner

ROAMING DATA PROCESSING METHOD, APPARATUS, AND SYSTEM

CROSS-REFERENCE TO RELATED APPLICATION(S)

This application is a continuation of International Application No. PCT/CN2020/078857, filed on Mar. 11, 2020, which claims priority to Chinese Patent Application No. 201910277936.1, filed on Apr. 8, 2019. The disclosure of the aforementioned applications are hereby incorporated by reference in their entireties.

TECHNICAL FIELD

Embodiments of this application relate to the field of communication technologies, and in particular, to a roaming data processing method and apparatus, and a system.

BACKGROUND

In a 5th generation (5G) communication network, a network data analytics function (NWDAF) network element is introduced to a core network. The NWDAF network element obtains a data analysis result based on terminal data collected from one or more network elements and a big data analysis technology, and sends the data analysis result to a network element for policy formulation.

Generally, however, a terminal may roam from one province or country to another province or country (e.g., inter-province roaming or inter-country roaming), or a terminal can roam from one public land mobile network (PLMN, referred to as a home PLMN) to another PLMN (referred to as a visited PLMN). A data homing problem of a terminal in a visited area directly affects from whom, a visited NWDAF or a home NWDAF, should the terminal request the data analysis result. However, how the visited NWDAF or the home NWDAF collects data of the terminal in a roaming scenario is a technical problem to be resolved.

SUMMARY

Embodiments of this application provide a roaming data processing method and apparatus, and a system, to effectively collect data of a terminal in a roaming scenario.

According to a first aspect, an embodiment of this application provides a roaming data processing method. The method includes: a first data analytics network element receiving, from a visited first network element, data of a terminal on the first network element, where the data includes first information and a first identifier, the first information is used to indicate that the terminal is roaming, and the first information includes any one or more of the following information corresponding to the terminal: a home public land mobile network PLMN identifier, a visited PLMN identifier, home area information, and visited area information. The first data analytics network element receives, from a second network element, data of the terminal on the second network element, where the data of the terminal on the second network element includes the first identifier. The first identifier is used to associate the data of the terminal on the first network element with the data of the terminal on the second network element. The first data analytics network element associates, based on the first identifier, the data of the terminal on the first network element with the data of the terminal on the second network element, to obtain data of the terminal during roaming.

This embodiment of this application provides a roaming data processing method. According to the method, the first data analytics network element obtains the data of the terminal on the visited first network element and the data of the terminal on the second network element. The first data analytics network element associates, based on the first identifier, the data of the terminal on the visited first network element with the data of the terminal on the second network element. The first data analytics network element associates, based on the first identifier, data of the terminal on at least two network elements (the second network element or the visited first network element), where the data includes the first information. Therefore, the first data analytics network element subsequently obtains a data analysis result of the terminal during roaming based on a big data analysis technology and based on data that is of the terminal, that is on the at least two network elements, and that is obtained after association.

In a possible implementation, the first information further includes any one or more of the following information: indication information used to indicate that the terminal is roaming, and a roaming scenario of a session of the terminal, where the roaming scenario is home routed or local breakout.

In a possible implementation, the first identifier includes at least one of the following information: an identifier of the first network element, an identifier of the second network element, an identifier allocated by the first network element to the terminal, an identifier allocated by the second network element to the terminal, an identifier of the terminal, an identifier of the session of the terminal, a session management context identifier of the terminal, an identifier of a flow of the terminal, an internet protocol IP 5-tuple, network instance information, and area information of the terminal.

In a possible implementation, the second network element is a visited second network element or a home second network element.

In a possible implementation, the method provided in this embodiment of this application further includes: the first data analytics network element sending, to a second data analytics network element, the data of the terminal during roaming.

In a possible implementation, the first data analytics network element is a visited data analytics network element, and the second data analytics network element is a home data analytics network element.

In a possible implementation, the first data analytics network element is a home data analytics network element, and the second data analytics network element is a visited data analytics network element.

In a possible implementation, the method provided in this embodiment of this application further includes: the first data analytics network element sending, to the first network element, a first request message used to request the data of the terminal on the first network element. Because the first network element may have data of a plurality of terminals, but not all of the plurality of terminals are roaming, the first network element may determine, by using the first request message, data that is of a roaming terminal on the first network element and needs to be reported.

In a possible implementation, the first request message includes any one or more of the following information: a terminal type, area information, and time information. Therefore, the first network element can determine a range for collecting roaming data of the terminal on the first network element.

In a possible implementation, the first request message may further include first indication information, and the first indication information is used to indicate to report data when the terminal is roaming. The first request message helps the first network element determine that the data of the terminal during roaming needs to be reported.

In a possible implementation, the first data analytics network element is a visited data analytics network element, and the second data analytics network element is a home data analytics network element. The method provided in this embodiment of this application further includes: the first data analytics network element receiving a second request message from the second data analytics network element, where the second request message is used to request the first data analytics network element to report data of a terminal on a visited network element in the roaming scenario. In this way, when the first data analytics network element and the second data analytics network element are data analytics network elements of a same operator, the visited data analytics network element may determine, based on a request of the home data analytics network element, that the data of the terminal on the visited network element in the roaming scenario needs to be reported.

According to a second aspect, an embodiment of this application provides a roaming data processing method, including: a visited first network element determines that a terminal is roaming. The first network element obtains data of the terminal on the first network element, where the data includes first information and a first identifier, the first information is used to indicate that the terminal is roaming, and the first information includes any one or more of the following information corresponding to the terminal: a home public land mobile network PLMN identifier, a visited PLMN identifier, home area information, and visited area information. The first network element sends the data of the terminal on the first network element to a first data analytics network element.

In a possible implementation, the first information further includes any one or more of the following information: indication information used to indicate that the terminal is roaming, and a roaming scenario of a session of the terminal, where the roaming scenario is home routed or local breakout.

In a possible implementation, the first identifier includes at least one of the following information: an identifier of the first network element, an identifier of a second network element, an identifier allocated by the first network element to the terminal, an identifier allocated by the second network element to the terminal, an identifier of the terminal, an identifier of the session of the terminal, a session management context identifier of the terminal, an identifier of a flow of the terminal, an internet protocol IP 5-tuple, network instance information, and area information of the terminal.

In a possible implementation, the first data analytics network element is a visited data analytics network element, or the first data analytics network element is a home data analytics network element.

In a possible implementation, the first network element is further configured to receive a first request message from the first data analytics network element, where the first request message is used to request the data of the terminal on the first network element in a roaming scenario.

In a possible implementation, the first request message includes any one or more of the following information: a terminal type, area information, and time information. Therefore, the first network element can determine a range for collecting roaming data of the terminal on the first network element.

In a possible implementation, the first request message may further include first indication information, and the first indication information is used to indicate to report the data when the terminal is in the roaming scenario. The first request message helps the first network element determine that the data of the terminal during roaming needs to be reported.

According to a third aspect, this application provides a roaming data processing apparatus. The roaming data processing apparatus can implement the method in any one of the first aspect or the possible implementations of the first aspect, and therefore can also implement beneficial effects of any one of the first aspect or the possible implementations of the first aspect. The roaming data processing apparatus may be a first data analytics network element, or may be an apparatus that can support the first data analytics network element in implementing the method in any one of the first aspect or the possible implementations of the first aspect, for example, a chip applied to the first data analytics network element. The apparatus may implement the foregoing method by using software or hardware, or by executing corresponding software by hardware.

For example, an embodiment of this application provides a roaming data processing apparatus, including: a communication unit, configured to receive, from a visited first network element, data of a terminal on the first network element, where the data includes first information and a first identifier, the first information is used to indicate that the terminal is roaming, and the first information includes any one or more of the following information corresponding to the terminal: a home public land mobile network PLMN identifier, a visited PLMN identifier, home area information, and visited area information. The communication unit is further configured to receive, from a second network element, data of the terminal on the second network element, where the data of the terminal on the second network element includes the first identifier. The first identifier is used to associate the data of the terminal on the first network element with the data of the terminal on the second network element. The processing unit is further configured to associate, based on the first identifier, the data of the terminal on the first network element with the data of the terminal on the second network element, to obtain data of the terminal during roaming.

In a possible implementation, the first information further includes any one or more of the following information: indication information used to indicate that the terminal is roaming, and a roaming scenario of a session of the terminal, where the roaming scenario is home routed or local breakout.

In a possible implementation, the first identifier includes at least one of the following information: an identifier of the first network element, an identifier of the second network element, an identifier allocated by the first network element to the terminal, an identifier allocated by the second network element to the terminal, an identifier of the terminal, an identifier of the session of the terminal, a session management context identifier of the terminal, an identifier of a flow of the terminal, an internet protocol IP 5-tuple, network instance information, and area information of the terminal.

In a possible implementation, the second network element is a visited second network element or a home second network element.

In a possible implementation, the communication unit is further configured to send, to a second data analytics network element, the data of the terminal during roaming.

In a possible implementation, the roaming data processing apparatus is a visited data analytics network element. The second data analytics network element is a home data analytics network element.

In a possible implementation, the roaming data processing apparatus is a home data analytics network element, and the second data analytics network element is a visited data analytics network element.

In a possible implementation, the communication unit is further configured to send, to the first network element, a first request message used to request the data of the terminal on the first network element.

In a possible implementation, the first request message includes any one or more of the following information: a terminal type, area information, and time information. Therefore, the first network element can determine a range for collecting roaming data of the terminal on the first network element.

In a possible implementation, the first request message may further include first indication information, and the first indication information is used to indicate to report data when the terminal is roaming. The first request message helps the first network element determine that the data of the terminal during roaming needs to be reported.

In a possible implementation, the roaming data processing apparatus is a visited data analytics network element, the second data analytics network element is a home data analytics network element, and the communication unit is further configured to receive a second request message from the second data analytics network element. The second request message is used to request the first data analytics network element to report the data of the terminal on the visited network element in the roaming scenario. In this way, when the first data analytics network element and the second data analytics network element are data analytics network elements of a same operator, the visited data analytics network element may determine, based on a request of the home data analytics network element, that the data of the terminal on the visited network element in the roaming scenario needs to be reported.

For another example, an embodiment of this application provides a roaming data processing apparatus. The roaming data processing apparatus may be a first data analytics network element, or may be a chip in the first data analytics network element. The roaming data processing apparatus may include a communication unit and a processing unit. When the roaming data processing apparatus is a first data analytics network element, the communication unit may be a communication interface or an interface circuit. The processing unit may be a processor. The processing unit executes instructions stored in a storage unit, to enable the roaming data processing apparatus to implement the method described in any one of the first aspect or the possible implementations of the first aspect. When the roaming data processing apparatus is a chip in the first data analytics network element, the processing unit may be a processor, and the communication unit may be collectively referred to as a communication interface.

Optionally, the processor, the communication interface, and the memory are coupled to each other.

According to a fourth aspect, this application provides a roaming data processing apparatus. The roaming data processing apparatus can implement the method in any one of the second aspect or the possible implementations of the second aspect, and therefore can also implement beneficial effects of any one of the second aspect or the possible implementations of the second aspect. The communication apparatus may be a first network element, or may be an apparatus that can support a first network element in implementing the method in any one of the second aspect or the possible implementations of the second aspect, for example, a chip applied to the first network element. The apparatus may implement the foregoing method by using software or hardware, or by executing corresponding software by hardware.

For example, an embodiment of this application provides a roaming data processing apparatus. The apparatus is an apparatus accessed by a terminal in a visited area. The apparatus includes a processing unit, configured to determine that the terminal is roaming. The processing unit is further configured to obtain data of the terminal on a first network element, where the data includes first information and a first identifier, the first information is used to indicate that the terminal is roaming, and the first information includes any one or more of the following information corresponding to the terminal: a home public land mobile network PLMN identifier, a visited PLMN identifier, home area information, and visited area information. The communication unit is further configured to send the data of the terminal on the first network element.

In a possible implementation, the first information further includes any one or more of the following information: indication information used to indicate that the terminal is roaming, and a roaming scenario of a session of the terminal. The roaming scenario is home routed or local breakout.

In a possible implementation, the first identifier includes at least one of the following information: an identifier of the first network element, an identifier of a second network element, an identifier allocated by the first network element to the terminal, an identifier allocated by the second network element to the terminal, an identifier of the terminal, an identifier of the session of the terminal, a session management context identifier of the terminal, an identifier of a flow of the terminal, an internet protocol IP 5-tuple, network instance information, and area information of the terminal.

In a possible implementation, the roaming data processing apparatus is a visited data analytics network element, or the first data analytics network element is a home data analytics network element.

In a possible implementation, the roaming data processing apparatus is further configured to receive a first request message from the first data analytics network element, where the first request message is used to request the data of the terminal on the first network element in a roaming scenario.

In a possible implementation, the first request message includes any one or more of the following information: a terminal type, area information, and time information. Therefore, the first network element can determine a range for collecting roaming data of the terminal on the first network element.

In a possible implementation, the first request message may further include first indication information, and the first indication information is used to indicate to report data when the terminal is roaming. The first request message helps the first network element determine that the data of the terminal during roaming needs to be reported.

For another example, an embodiment of this application provides a roaming data processing apparatus. The roaming data processing apparatus may be a first network element, or may be a chip in the first network element. The roaming data processing apparatus may include a communication unit and a processing unit. When the roaming data processing apparatus is the first network element, the communication unit may be a communication interface or an interface circuit. The roaming data processing apparatus may further include a storage unit. The processing unit may be a processor. The processing unit executes instructions stored in the storage unit, to enable the roaming data processing apparatus to implement the method described in any one of the second aspect or the possible implementations of the second aspect. When the roaming data processing apparatus is a chip in the first network element, the processing unit may be a processor, and the communication unit may be collectively referred to as a communication interface. The processing unit executes the computer program code stored in the storage unit, to enable the first network element to implement the method described in any one of the second aspect or the possible implementations of the second aspect.

Optionally, the processor, the communication interface, and the memory are coupled to each other.

According to a fifth aspect, an embodiment of this application provides a computer-readable storage medium. The computer-readable storage medium stores a computer program or instructions. When the computer program or the instructions are run on a computer, the computer is enabled to perform the roaming data processing method described in any one of the first aspect or the possible implementations of the first aspect.

According to a sixth aspect, an embodiment of this application provides a computer-readable storage medium. The computer-readable storage medium stores a computer program or instructions. When the computer program or the instructions are run on a computer, the computer is enabled to perform the roaming data processing method described in any one of the second aspect or the possible implementations of the second aspect.

According to a seventh aspect, an embodiment of this application provides a computer program product including instructions. When the instructions are run on a computer, the computer is enabled to perform the roaming data processing method described in any one of the first aspect or the possible implementations of the first aspect.

According to an eighth aspect, this application provides a computer program product including instructions. When the instructions are run on a computer, the computer is enabled to perform the roaming data processing method described in any one of the second aspect or the possible implementations of the second aspect.

According to a ninth aspect, an embodiment of this application provides a communication system. The communication system includes any one or more of the following: the roaming data processing apparatus described in any one of the third aspect and the possible implementations thereof, the roaming data processing apparatus described in the fourth aspect and the possible implementations of the fourth aspect, and a second network element.

For an action performed by the second network element, refer to an action performed by the first network element. This is not limited in this embodiment of this application.

According to a tenth aspect, an embodiment of this application provides a communication apparatus. The communication apparatus includes a processor and a storage medium, the storage medium stores instructions, and when the instructions are run by the processor, the roaming data processing method described in the first aspect or the possible implementations of the first aspect is implemented.

According to an eleventh aspect, an embodiment of this application provides a communication apparatus. The communication apparatus includes a processor and a storage medium, the storage medium stores instructions, and when the instructions are run by the processor, the roaming data processing method described in the second aspect or the possible implementations of the second aspect is implemented.

According to a twelfth aspect, an embodiment of this application provides a communication apparatus. The communication apparatus includes one or more modules, configured to implement the methods according to the first aspect and the second aspect, and the one or more modules may correspond to the steps in the methods according to the first aspect and the second aspect.

According to a thirteenth aspect, an embodiment of this application provides a chip. The chip includes a processor and a communication interface. The communication interface is coupled to the processor. The processor is configured to run a computer program or instructions, to implement the roaming data processing method described in the first aspect or the possible implementations of the first aspect. The communication interface is configured to communicate with another module outside the chip.

According to a fourteenth aspect, an embodiment of this application provides a chip. The chip includes a processor and a communication interface. The communication interface is coupled to the processor. The processor is configured to run a computer program or instructions, to implement the roaming data processing method described in the second aspect or the possible implementations of the second aspect. The communication interface is configured to communicate with another module outside the chip.

Specifically, the chip provided in this embodiment of this application further includes a memory, configured to store the computer program or the instruction.

According to a fifteenth aspect, an embodiment of this application provides a communication apparatus. The communication apparatus includes a processor, the processor is coupled to a memory or the processor is connected to the memory, and the processor is configured to run instructions or a computer program stored in the memory, to implement the roaming data processing method described in the first aspect or the possible implementations of the first aspect.

According to a sixteenth aspect, an embodiment of this application provides a communication apparatus. The communication apparatus includes a processor, the processor is coupled to a memory or the processor is connected to the memory, and the processor is configured to run instructions or a computer program stored in the memory, to implement the roaming data processing method described in the second aspect or the possible implementations of the second aspect.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system, refer to beneficial effects of a corresponding solution in the corresponding method provided above.

DESCRIPTION OF EMBODIMENTS

Figure 1:
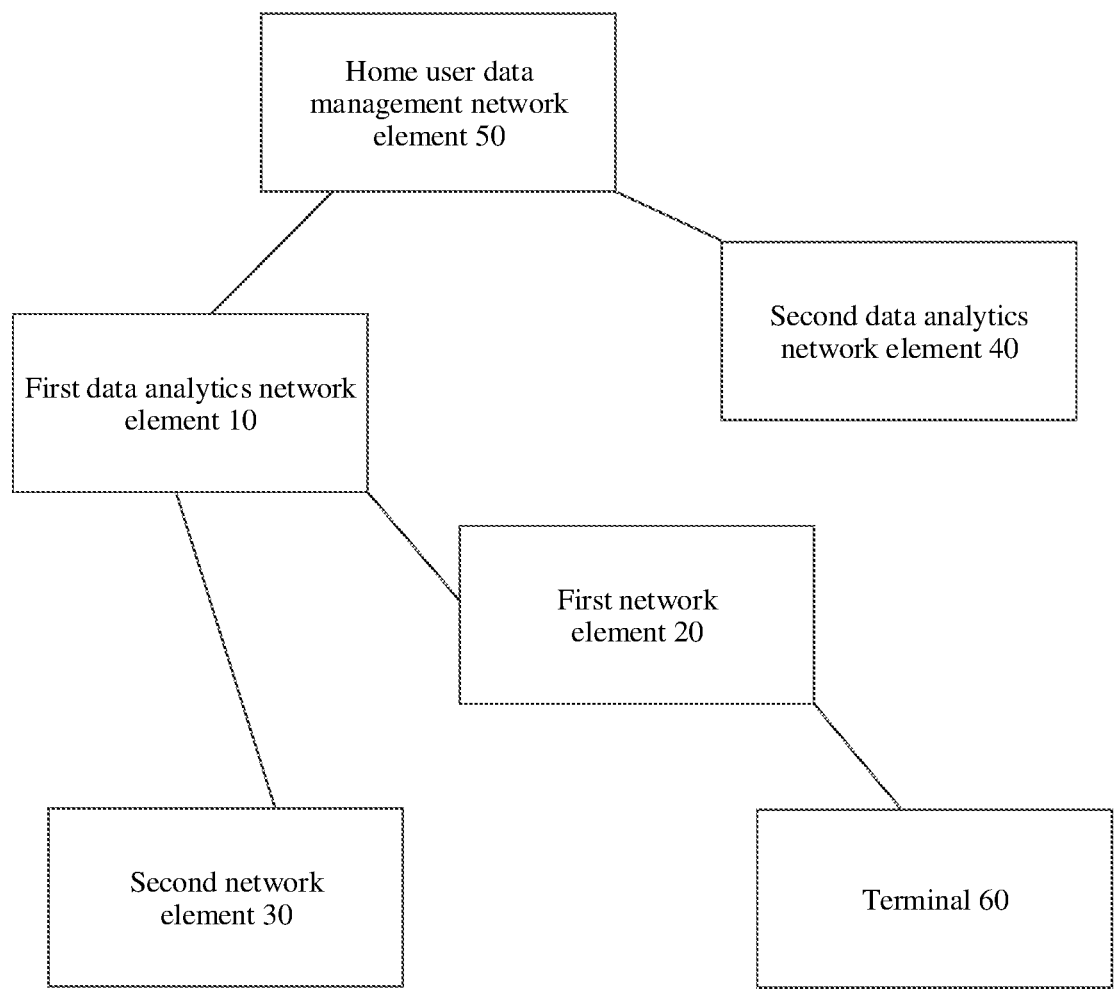
FIG. 1 is an example schematic diagram of a structure of a communication system according to an embodiment of this application.

To clearly describe the technical solutions in embodiments of this application, terms such as "first" and "second" are used in the embodiments of this application to distinguish between same items or similar items that have basically same functions and purposes. For example, a first request message and a second request message are merely used to distinguish between different request messages, and a sequence of the first request message and the second request message is not limited. A person skilled in the art may understand that the terms such as "first" and "second" are not intended to limit a quantity or an execution sequence, and the terms such as "first" and "second" do not indicate a definite difference.

It should be noted that, in this application, the term such as "example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that, with evolution of the network architecture and emergence of new service scenarios, the technical solutions provided in the embodiments of this application are also applicable to similar technical problems.

In this application, "at least one" means one or more, and "a plurality of" means two or more. And/or describes an association relationship between associated objects, and indicates that three (or more) relationships may exist. For example, A and/or B may indicate the following cases: A exists alone, both A and B exist, and B exists alone, where A and B may be singular or plural. The character "/" generally indicates an "or" relationship between the associated objects. At least one of the following or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

The technical solutions in the embodiments of this application may be applied to various communication systems, for example, code division multiple access (CDMA), time division multiple access (TDMA), frequency division multiple access (F-DMA), orthogonal frequency division multiple access (OFDMA), single carrier frequency division multiple access (SC-FDMA), and another system. The terms "system" and "network" can be interchanged with each other. The CDMA system may implement wireless technologies such as universal terrestrial radio access (UTRA) and CDMA 2000. The UTRA may include a wideband CDMA (WCDMA) technology and another variation of CDMA. The CDMA 2000 may cover standards such as the interim standard (IS) 2000 (IS-2000), the IS-95, and the IS-856. The TDMA system may implement a wireless technology such as a global system for mobile communications (GSM). The OFDMA system may implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. The UTRA corresponds to a universal mobile telecommunications system (UMTS), and the E-UTRA corresponds to an evolved version of the UMTS. A new version of the UMTS that uses the E-UTRA is used in long term evolution (LTE) and various versions evolved based on LTE in 3GPP. A 5G communication system and new radio (NR) are next-generation communication systems that are under research. In addition, the communication systems are further applicable to a future-oriented communication technology, and are applicable to the technical solutions provided in the embodiments of this application.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that, with evolution of the network architecture and emergence of new service scenarios, the technical solutions provided in the embodiments of this application are also applicable to similar technical problems. The embodiments of this application are described by using an example in which the provided method is applied to an NR system or a 5G network.

FIG. 1 is a schematic diagram of a structure of a communication system according to an embodiment of this application. The communication system includes a first data analytics network element 10, a first network element 20 communicating with the first data analytics network element 10, and a second network element 30 communicating with the first data analytics network element 10.

For example, the first network element 20 may be a visited network element. In addition, in a possible implementation, the communication system may further include one or more terminals 60, a second data analytics network element 40, and a home user data management network element 50. In this embodiment of this application, a visited network element may be abbreviated as an V-network element name. For example, a visited data analytics network element may be abbreviated as an V-data analytics network element. A home network element can be abbreviated as a H-network element name. For example, a home data analytics network element may be abbreviated as a H-data analytics network element.

The second data analytics network element 40 may be a home data analytics network element, and the first data analytics network element 10 may be a visited data analytics network element. Alternatively, the first data analytics network element 10 may be a home data analytics network element, and the second data analytics network element 40 may be a visited data analytics network element.

A home area in this embodiment of this application refers to an area or a region of a network to which a terminal subscribes.

A visited area in this embodiment of this application refers to an area or a region of a network to which a terminal does not subscribe.

The first network element 20 may be a core network element in a core network accessed by the one or more terminals 60 when the one or more terminals 60 roam to the visited area, or an access network element in an access network accessed by the one or more terminals 60 when the one or more terminals 60 roam to the visited area.

The second network element 30 may be a visited network element, or may be a home network element. Specifically, the second network element 30 is a core network element in a core network accessed by the one or more terminals 60 when the one or more terminals 60 roam to the visited area, or an access network element in an access network accessed by the one or more terminals 60 when the one or more terminals 60 roam to the visited area, or may be a core network element in a core network or a network element in an access network accessed by the one or more terminals 60 when the one or more terminals 60 are in the home area. The core network element in this embodiment of this application may be any one or more of a user plane network element, a mobility management network element, a session management network element, a policy control network element, an application network element, or a network management network element.

It should be noted that the second network element 30 and the first network element 20 are different network elements. It should be understood that when both the first network element 20 and the second network element 30 are visited network elements, the second network element 30 and the first network element 20 are different network elements. When the first network element 20 is a visited network element, and the second network element 30 is a home network element, the first network element 20 and the second network element 30 may be a same network element. For example, when the first network element 20 is a visited network element, and the second network element 30 is a home network element, the first network element 20 and the second network element 30 may be session management network elements.

It should be understood that in this embodiment of this application, the one or more terminals 60 may access a core network by using an access network. In this embodiment of the present technology, the one or more terminals 60 may be distributed in an entire wireless network, and each of the one or more terminals 60 may be static or mobile.

In this embodiment of this application, a core network accessed by the one or more terminals 60 in the home area or a core network accessed by the one or more terminals 60 in the visited area may be a 5th generation core network (for example, a 5G core network (5G Core, 5GC)) or a 4th generation (4G) core network (for example, an evolved packet core (EPC). Certainly, the core network may alternatively be a core network using a 3rd generation (3G) mobile communication technology or a core network using another future mobile communication technology. This is not limited in this embodiment of this application.

The core network accessed by the one or more terminals 60 in the home area and the core network accessed by the one or more terminals 60 in the visited area may be core networks of a same generation, or may be core networks of different generations. For example, the core network accessed by the one or more terminals 60 in the home area is a 5GC, and a core network accessed by the one or more terminals 60 when the one or more terminals 60 roam to the visited area may be an EPC or a 3G core network. For another example, the core network accessed by the one or more terminals 60 in the home area is a 5GC, and the core network accessed by the one or more terminals 60 when the one or more terminals 60 roam to the visited area may still be a 5GC. This is not limited in the embodiments of this application.

It may be understood that if the core network accessed by the one or more terminals 60 is a 5GC, the access network accessed by the one or more terminals 60 is an access network in a 5G network. In this case, the access network element may be an access device in the 5G network, or may be a radio access device, for example, a next generation NodeB (gNB). If the core network accessed by the one or more terminals 60 is an EPC, the access network may be an access network in a 4G network. In this case, the access network element may be an evolved NodeB (eNB).

In this embodiment of this application, the core network accessed by the one or more terminals 60 in a roaming area and the core network accessed by the one or more terminals 60 in the home area may be core networks of a same operator, or may be core networks of different operators. When the core network accessed by the one or more terminals 60 in the roaming area and the core network accessed by the one or more terminals 60 in the home area are inter-operator core networks, core network elements in core networks of different operators or access network elements of different operators may communicate with each other, or may not communicate with each other. Whether the core network elements in the core networks of different operators or the access network elements of different operators communicate with each other may depend on a result of negotiation between different operators. This is not limited in this embodiment of this application.

For example, the first data analytics network element 10 and the second data analytics network element 40 may be data analytics network elements of a same operator. Certainly, the first data analytics network element 10 and the second data analytics network element 40 may alternatively be data analytics network elements of different operators. There may be or may not be a communication interface between the first data analytics network element 10 and the second data analytics network element 40. For example, when the first data analytics network element 10 and the second data analytics network element 40 are data analytics network elements of a same operator, the first data analytics network element 10 and the second data analytics network element 40 may communicate with each other through an N32 interface between a visited security edge protection proxy (V-SEPP) and a home SEPP (H-SEPP). Certainly, the first data analytics network element 10 may directly communicate with the second data analytics network element 40 through a communication interface, for example, Nx. The first data analytics network element 10 and the second data analytics network element 40 of a same operator may exchange data of the terminal on the home or visited core network element or access network element.

It should be noted that roaming scenarios of the one or more terminals 60 in this embodiment of this application may be explained as follows:

(1) Inter-operator roaming (which may also be referred to as inter-public land mobile network (PLMN) roaming): A terminal subscribing to an operator A moves from a network of the operator A to a network of an operator B.

For the inter-operator roaming scenario, an access network element of the operator A may be used as a home access network element of the terminal. A core network element of the operator A may be used as a home core network element of the terminal. An access network element of the operator B may be used as a visited access network element of the terminal. A core network element of the operator B may be used as a visited core network element of the terminal.

(2) Inter-province, inter-country, or inter-region roaming in a same PLMN means that a terminal of an operator roams from a home province (region) A to another province (region) B, and the terminal accesses networks of a same operator in the province (region) A and the province (region) B. Alternatively, a terminal of an operator roams from one home country to another country. It should be understood that the terminal accesses networks of the same operator in different countries.

It should be noted that, for a terminal in a roaming scenario, a service policy formulated by the home core network element for the terminal may be different from a service policy formulated by the visited core network element for the terminal. Therefore, for the terminal, the terminal needs to know from whom, a visited data analytics network element or a home data analytics network element, should the terminal request a data analysis result.

Figure 2:
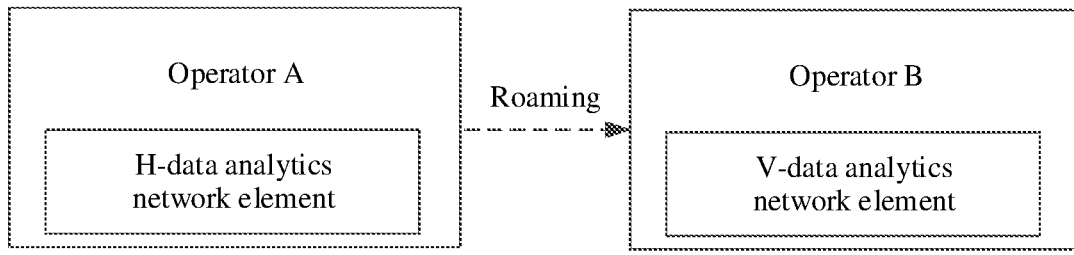
FIG. 2 is an example schematic diagram of inter-operator roaming according to an embodiment of this application.

For example, the operator A is China Mobile, and the operator B is China Unicom. When a terminal of China Mobile moves from a network of China Mobile to a network of China Unicom, China Unicom may limit a network service of the terminal. That is, the terminal can enjoy only a 2G/3G network service, and cannot enjoy a 4G/5G network service. In this case, as shown in FIG. 2, the home data analytics network element may be an H-data analytics network element of the operator A. The visited data analytics network element may be a V-data analytics network element of the operator B.

Figure 3:
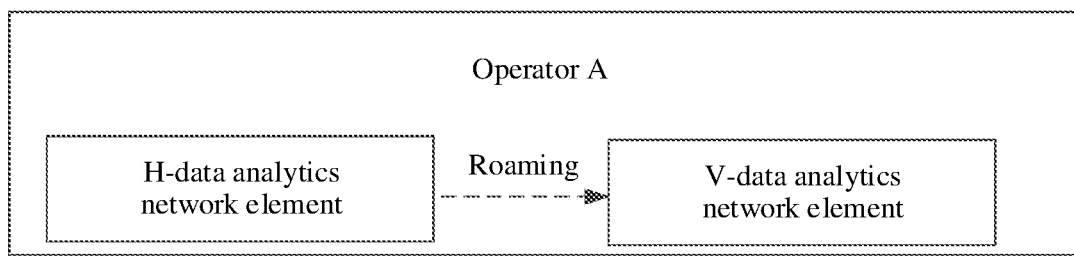
FIG. 3 is an example schematic diagram of inter-area roaming according to an embodiment of this application.

For example, a terminal A moves from a home region A (for example, Shanghai) of the operator A to a region B (for example, Zhejiang) of the operator A. If the terminal A has no traffic restriction in the home region A but has a traffic restriction in the region B, a data analytics network element of the home region A or a data analytics network element of the visited region B not only analyzes behavior of the terminal A in the home region A, but also analyzes behavior of the terminal A in the region B, perform separate control. As shown in FIG. 3, the home data analytics network element may be an H-data analytics network element of the operator A in the home region A. The visited data analytics network element may be a V-data analytics network element of the operator A in the region B.

In the 5GC, a network element or an entity corresponding to a user plane network element may be a user plane function (UPF) network element, a network element or an entity corresponding to a mobility management network element may be an access and mobility management function (AMF) network element, a network element or an entity corresponding to a session management network element may be a session management function (SMF) network element, a network element or an entity corresponding to a policy control network element may be a policy control function network element, a network element or an entity corresponding to an application network element may be an application function (AF) network element, or a network element or an entity corresponding to a network management network element may be an operation, administration, and maintenance (OAM) network element (also referred to as an operation, administration, and maintenance network element). In a 5G network, the data analytics network element in the embodiments of this application may be a network data analytics function (NWDAF) network element in the 5GC, may be a management data analytics function (MDAF) network element of a network management system, or may even be a data analytics network element on a radio access network (RAN) side.

A network element or an entity corresponding to a mobility management network element in the EPC may be a mobility management entity (MME). A network element or an entity corresponding to the user plane network element may be a public data network gateway (PGW) or a serving network element (SGW). A network element or an entity corresponding to the policy control network element may be a policy and charging rules function (PCRF) unit. In other words, in the 4G core network, the MME has both a session management function and a mobility management function. The data analytics network element in the 4G core network may also be referred to as a network data analytics network element.

Figure 4:
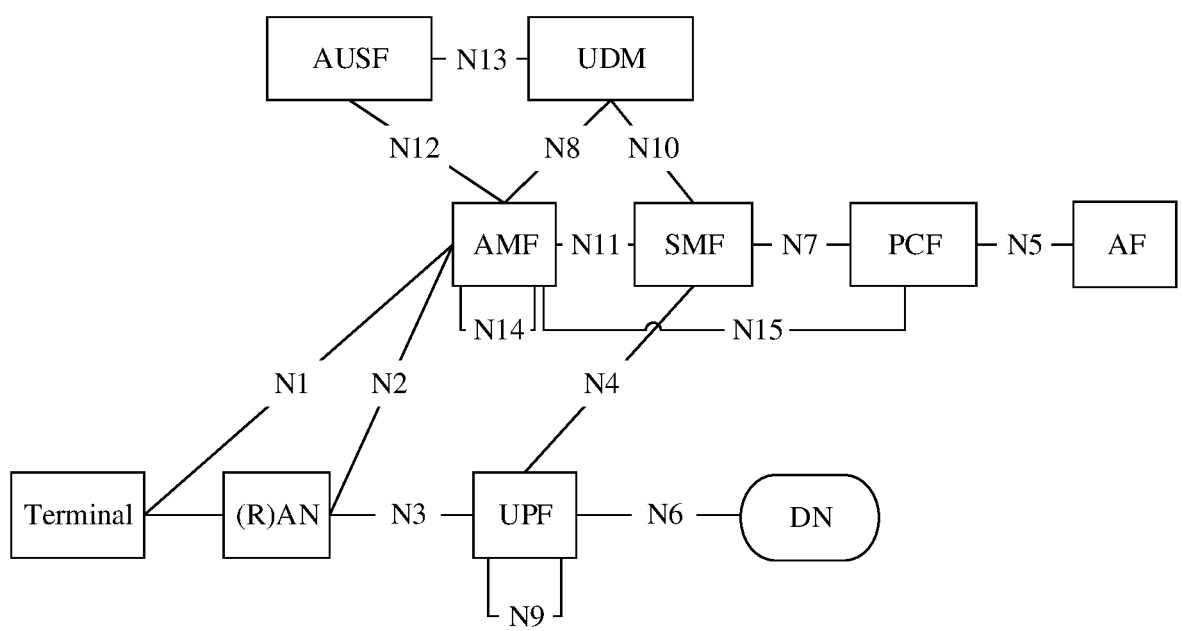
FIG. 4 is an example schematic diagram of a 5G network architecture according to an embodiment of this application.

For example, the core network is a 5GC. As shown in FIG. 4, in addition to the foregoing core network element and the access network element, the 5GC may further include an authentication server function (AUSF) network element, a network slice selection function (NSSF) network element, a network capability exposure function (NEF) network element, a user data repository (UDR), a unified data management (UDM) network element, a data network (DN), and a network repository function (NRF) network element. The NSSF network element, the UDR, the NEF network element, and the NRF network element are not shown in the architectural diagram in FIG. 4, and the NRF network element is mainly used to discover a network element.

The terminal communicates with the AMF network element through an N1 interface (N1 for short). The AMF entity communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates, through an N6 interface (N6 for short), with a data network (DN) managed and controlled by the AF network element. The terminal accesses a network through an access network element (for example, the RAN device), and the access network element communicates with the AMF network element through an N2 interface (N2 for short). The SMF network element communicates with a policy control function (PCF) network element through an N7 interface (N7 for short), and the PCF network element communicates with the AF network element through an N5 interface. The access network element communicates with the UPF network element through an N3 interface (N3 for short). Any two AMF network elements communicate with each other through an N14 interface (N14 for short). The SMF network element communicates with the UDM through an N10 interface (N10 for short). The AMF network element communicates with the AUSF through an N12 interface (N12 for short). The AUSF network element communicates with the UDM network element through an N13 interface (N13 for short). The AMF network element communicates with the UDM network element through an N8 interface (N8 for short).

Figure 5:
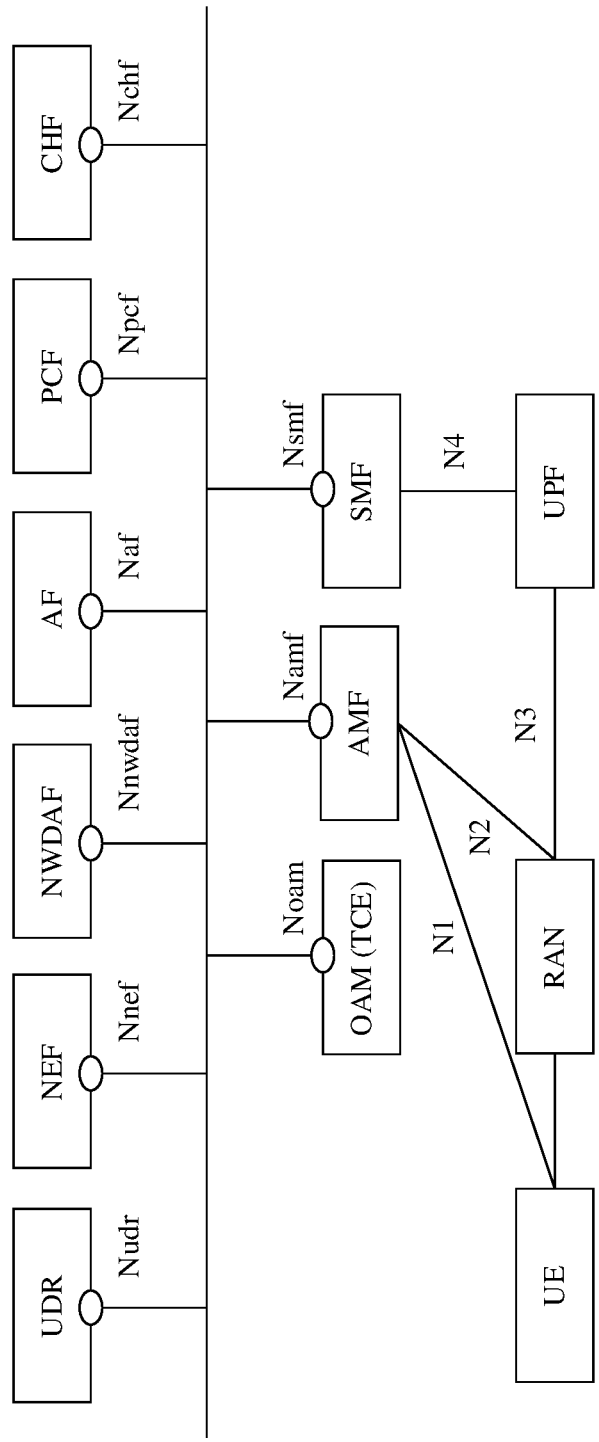
FIG. 5 is an example schematic diagram of another 5G network architecture according to an embodiment of this application.

It should be understood that, in the network architecture shown in FIG. 4, control plane network elements may alternatively interact with each other by using a service-oriented interface. For example, as shown in FIG. 5, the AMF network element, the SMF network element, the UDM network element, or the PCF network element interact with each other through a service-oriented interface. For example, a service-oriented interface provided by the AMF network element to the outside may be Namf. A service-oriented interface provided by the SMF network element to the outside may be Nsmf. A service-oriented interface provided by the UDM network element to the outside may be Nudm. A service-oriented interface provided by the PCF network element to the outside may be Npcf. It should be understood that for related descriptions of names of various service-oriented interfaces, refer to a diagram of a 5G system architecture in the Standard 23501.

It should be noted that FIG. 4 or FIG. 5 merely provides an example of the UPF network element and the SMF network element. Certainly, a plurality of UPF network elements and SMF network elements may be included. For example, an SMF network element 1 and an SMF network element 2 are included. This is not specifically limited in this embodiment of this application.

It should be noted that the access network element, the AMF network element, the SMF network element, the UDM network element, the UPF network element, the PCF network element, and the like in FIG. 4 or FIG. 5 are merely names, and the names constitute no limitation on the devices. In the 5G network and another future network, network elements or entities corresponding to the access network element, the AMF network element, the SMF network element, the UDM network element, the UPF network element, and the PCF network element may have other names. This is not specifically limited in this embodiment of this application. For example, the UDM network element may alternatively be replaced with a home subscriber server (HSS), a user subscription database (USD), a database entity, or the like. A general description is provided herein.

Figure 6:
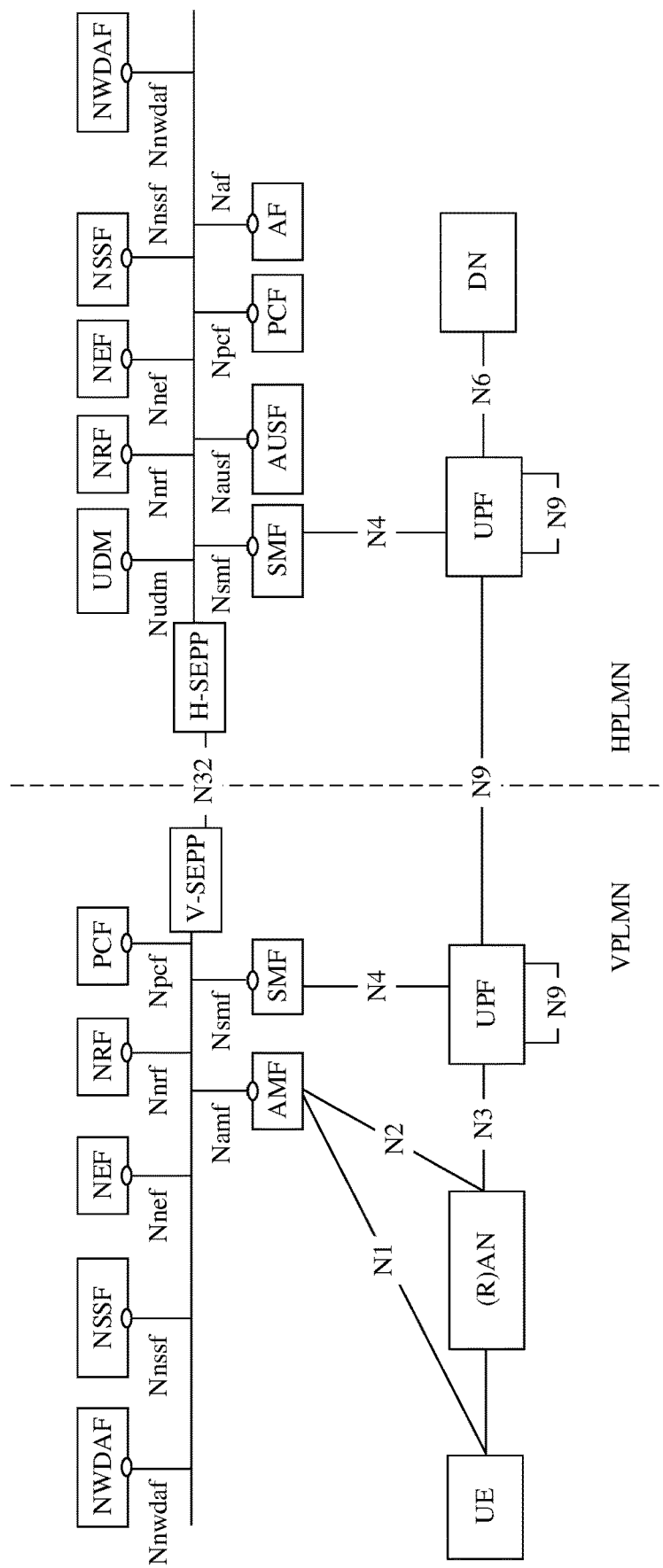
FIG. 6 is an example schematic architectural diagram of a home routed scenario according to an embodiment of this application.

For example, the communication system shown in FIG. 1 is applied to a home routed scenario of the 5G roaming network architecture shown in FIG. 6. In the home routed scenario, when the terminal is in a visited area, the DN is provided by a home area.

As shown in FIG. 6, the home routed scenario includes a visited public land mobile network (VPLMN) and a home public land mobile network (HPLMN).

The VPLMN includes: a terminal, a RAN, a visited AMF network element, a visited SMF network element, a visited NSSF network element, a visited NEF network element, a visited NRF network element, a visited PCF network element, a visited UPF network element, and a visited SEPP (V-SEPP). The home PLMN includes: a home UPF network element, a home PCF network element, a home NSSF network element, a home SMF network element, a home AUSF network element, a DN, a home AF network element, a home NRF network element, a home UDM network element, a home NEF network element, and a home SEPP (H-SEPP).

The home PLMN and the visited PLMN communicate with each other by using the visited SEPP and the home SEPP. An N32 interface exists between the home SEPP and the visited SEPP.

Figure 7:
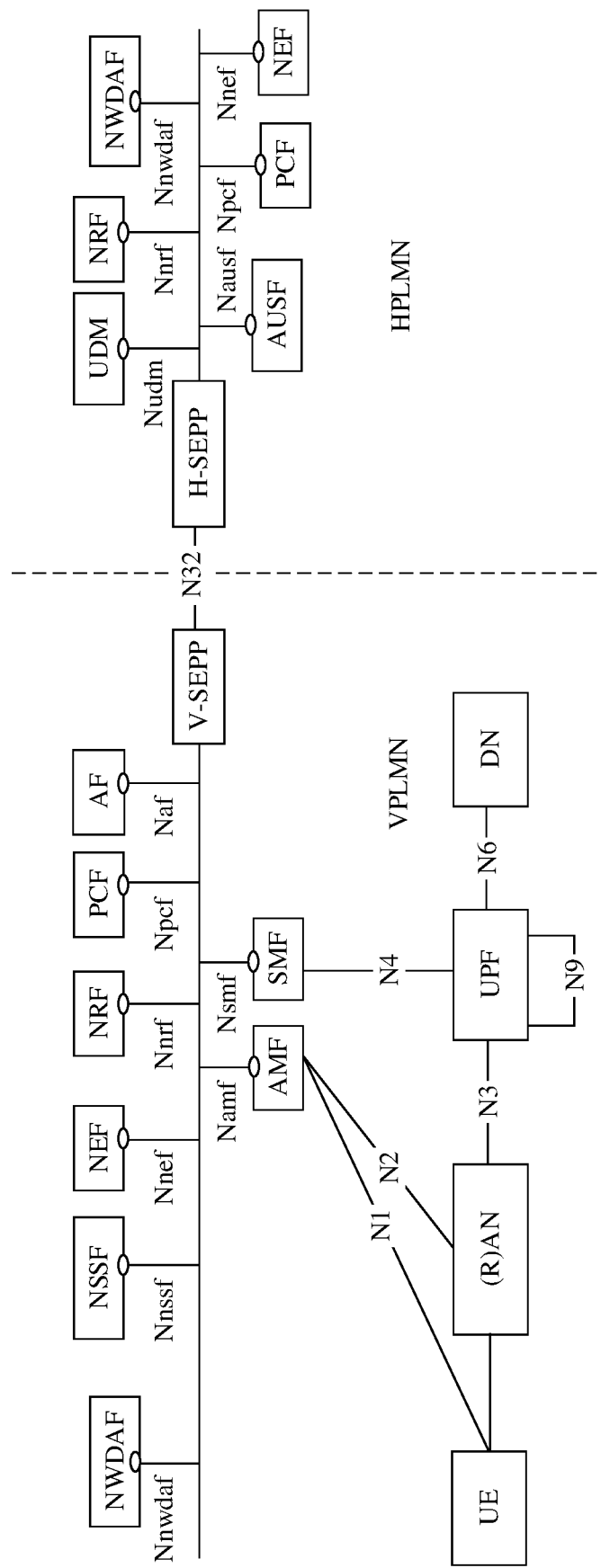
FIG. 7 is an example schematic diagram of a structure of local breakout according to an embodiment of this application.
Figure 8A:
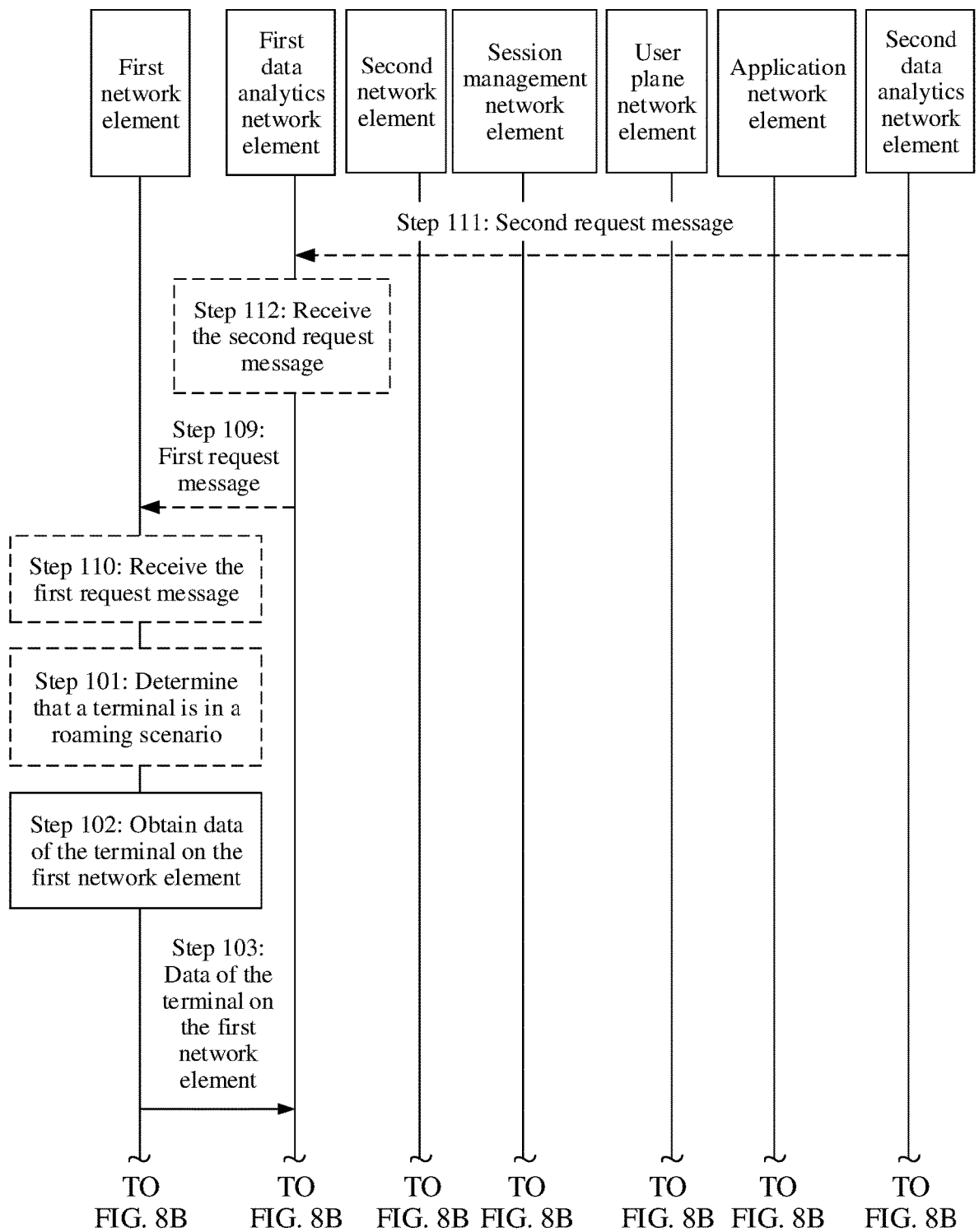
FIG. 8A, FIG. 8B, FIG. 8C, and FIG. 8D are example schematic flowcharts of a roaming data processing method according to an embodiment of this application.
Figure 8B:
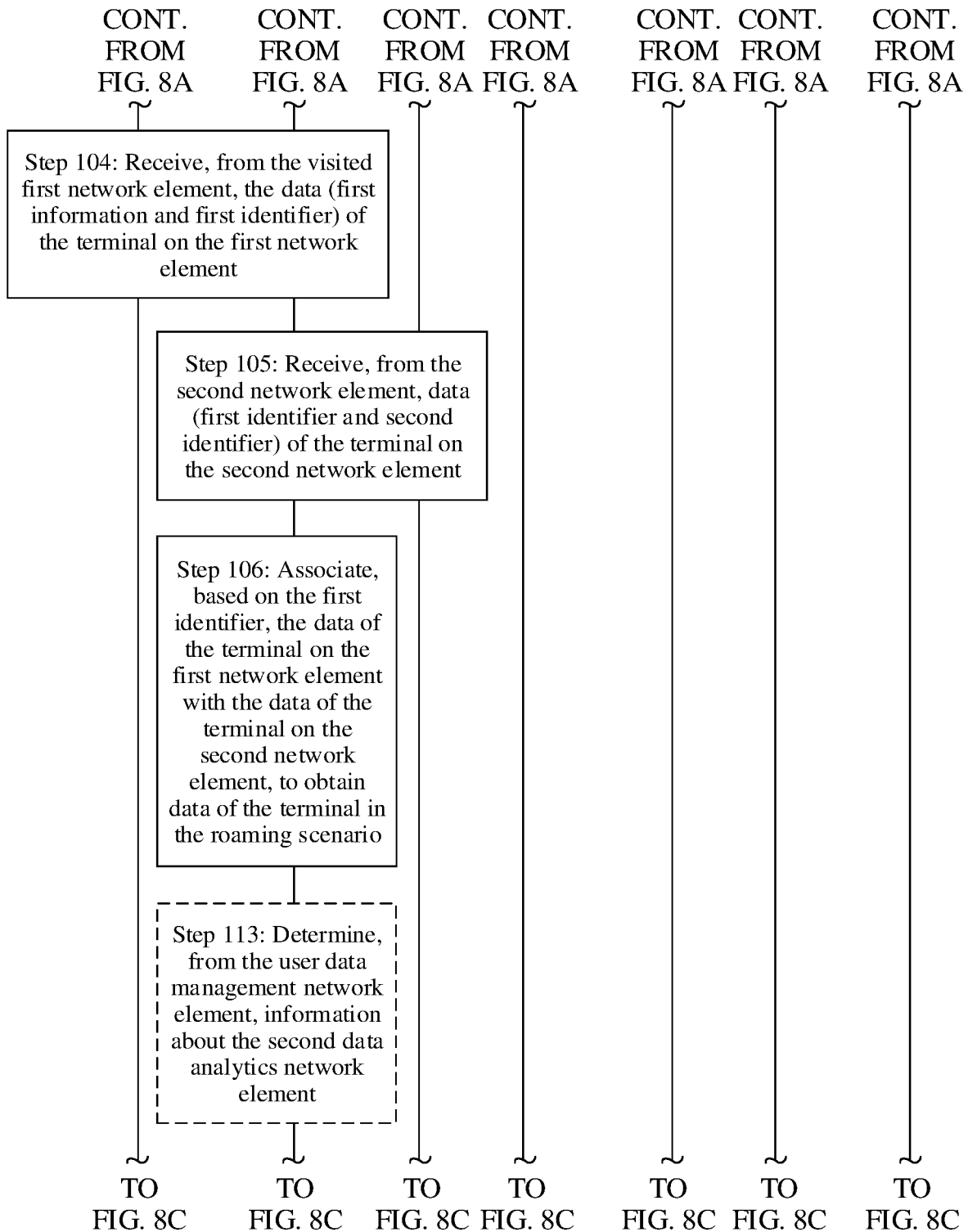
Figure 8C:
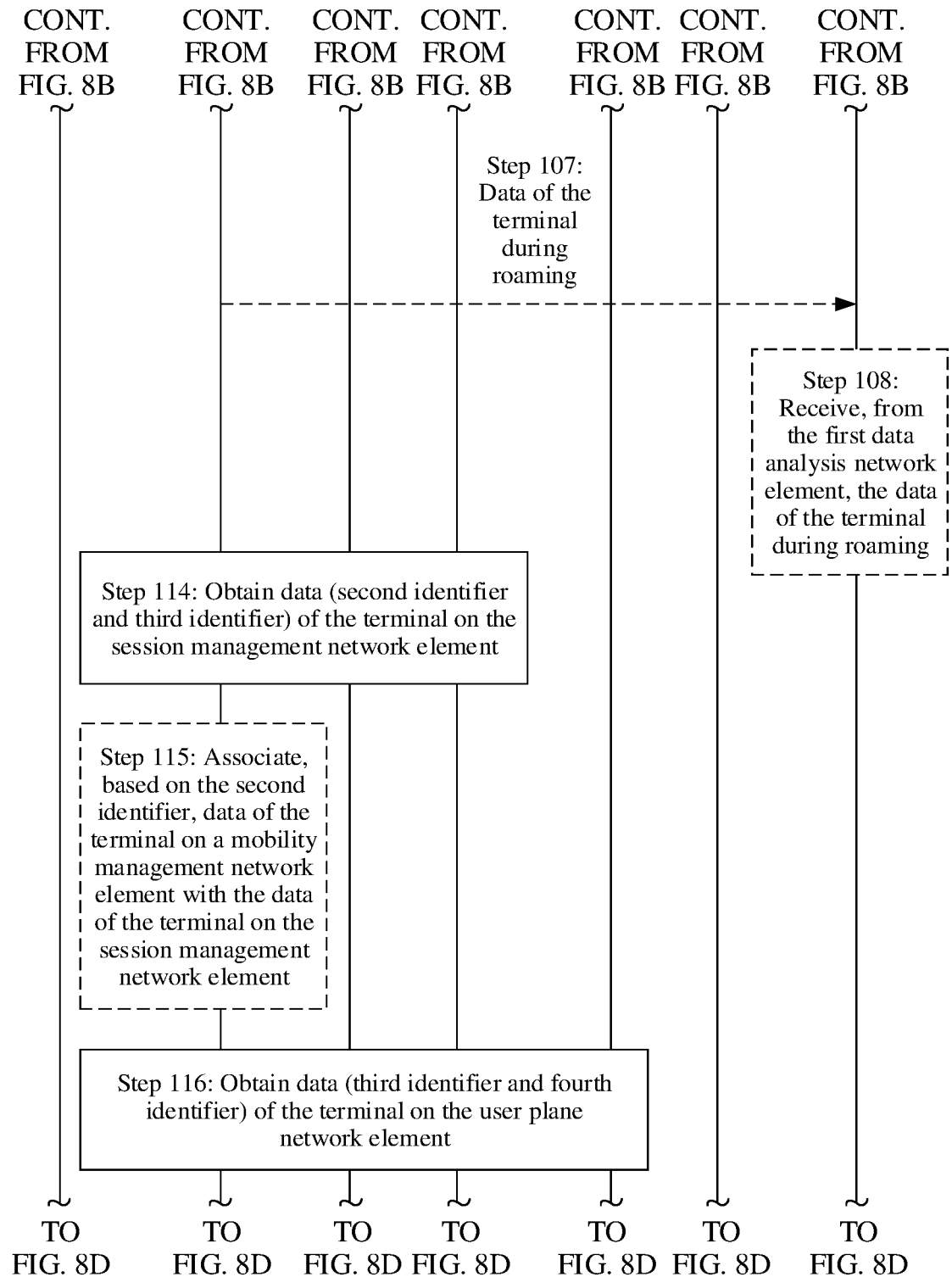
Figure 8D:
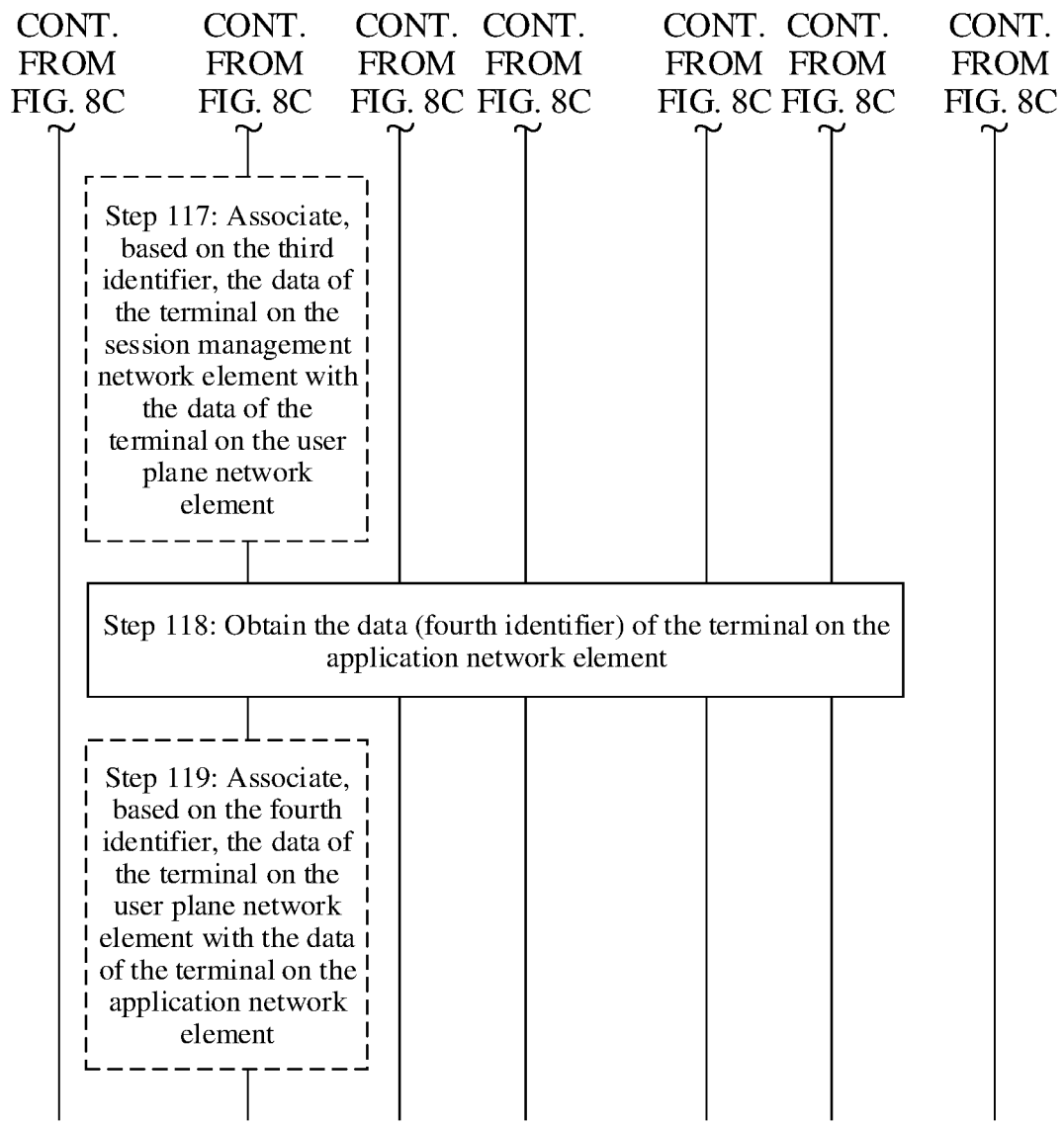

As shown in FIG. 7, for example, the communication system shown in FIG. 1 is applied to a local breakout roaming scenario of the 5G roaming network architecture shown in FIG. 7. In the local breakout roaming scenario, when the terminal is in a visited area, the DN is provided by the visited area.

As shown in FIG. 7, the local breakout roaming scenario includes a VPLMN and an HPLMN. The VPLMN includes: a terminal, a RAN, a UPF network element, a DN, a visited AMF network element, a visited SMF network element, a visited NSSF network element, a visited NEF network element, a visited NRF network element, a visited PCF network element, a visited AF network element, and a V-SEPP. The HPLMN includes: an H-SEPP, a home UDM network element, a home NRF network element, a home AUSF network element, a home PCF network element, and a home NEF network element.

The home PLMN and the visited PLMN communicate with each other by using the visited SEPP and the home SEPP. An N32 interface exists between the home SEPP and the visited SEPP.

It should be noted that, for the interfaces between the network elements in FIG. 6 and FIG. 7, refer to the descriptions in FIG. 4 and FIG. 5.

A terminal is a device that provides a user with voice and/or data connectivity, for example, a handheld device or a vehicle-mounted device with a wireless connection function. The terminal may also be referred to as user equipment (UE), an access terminal, a user unit, a user station, a mobile station, a remote station, a remote terminal, mobile equipment, a user terminal wireless telecom equipment, a user agent, user equipment, or a user apparatus. The terminal may be a station (STA) in a wireless local area network (WLAN), or may be a cellular phone, a cordless phone, a session initiation protocol (IP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next generation communication system (for example, a 5th generation (5G) communication network), a terminal in a future evolved public land mobile network (PLMN), or the like. 5G may also be referred to as new radio (NR).

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but is used to implement a powerful function through software support, a data exchange, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelry for monitoring physical signs.

The NWDAF may collect data from network elements and analyze the data to obtain a data analysis result. The NWDAF feeds back the data analysis result to a core network element (for example, a policy control network element, to assist the policy control network element in formulating a policy). For example, the NWDAF may collect end-to-end service data (including service experience information (mean opinion score (MOS))) and network data (a bandwidth, a delay, and an error rate of a quality of service (QoS) flow corresponding to a service). The NWDAF obtains, through training, a service MOS model based on service data and network data. The service MOS model is used to represent a correspondence between a service MOS of a service and a network QoS parameter. In an actual service, the NWDAF may collect network data of the QoS flow of the service from a network side, and measure the service MOS of the current service based on the service MOS model. The NWDAF feeds back the measured service MOS to the policy control network element to adjust the QoS parameter of the service. For example, if the service MOS has an excessively low score, bandwidth of the service may be increased. Therefore, to accurately obtain service experience of a terminal, data of the terminal on different network elements needs to be learned of in time.

It may be understood that steps performed by a first data analytics network element in a roaming data processing method in the embodiments of this application may alternatively be performed by a chip applied to the first data analytics network element, and steps performed by a first network element in the roaming data processing method may alternatively be performed by a chip applied to the first network element. Steps performed by a second network element in the roaming data processing method may alternatively be performed by an apparatus, for example, by a chip, applied to the second network element. In the following embodiments, an example in which execution bodies of the roaming data processing method are the first data analytics network element, the first network element, and the second network element is used for description.

Embodiment 1

FIG. 8 is a schematic flowchart of a roaming data processing method according to an embodiment of this application. The method includes the following steps.

Step 101: A visited first network element determines that a terminal is in a roaming scenario.

That the terminal is in the roaming scenario may be that the terminal is in inter-operator roaming. Alternatively, that the terminal is in the roaming scenario may be that the terminal is roaming across provinces, countries, or urban areas of a same operator.

Step 102: The first network element obtains data of the terminal on the first network element, where the data includes first information and a first identifier. The first information is used to indicate that the terminal is roaming, and the first information includes any one or more of the following information corresponding to the terminal: a home PLMN identifier, a visited PLMN identifier, home area information, and visited area information.

The first identifier is used to associate the data of the terminal on the first network element with data of the terminal on a second network element.

For example, the first network element may be any one of a mobility management network element, an access network element, a terminal, a session management network element, a user plane network element, a policy control network element, or an application network element.

For example, the first network element is a mobility management network element. The data of the terminal on the first network element may include terminal area information (a cell, a cell list, a tracking area, or a tracking area list). This part of data may be directly reported by the first network element to a first data analytics network element through a service-oriented interface.

Further, for example, the first network element is a visited access network element. The data of the terminal on the first network element may be minimization of drive test (MDT) data, or may be data of another type (for example, quality of experience (QoE)) data. This part of data is reported by the terminal, transferred by the first network element, and finally sent to the first data analytics network element. For example, the MDT data of the terminal includes radio signal received power (RSRP) or radio signal received quality (RSRQ), a power headroom, a received signal strength indicator (RSSI), and a round trip time (RTT).

Further, for example, the first network element is a visited session management network element. The data of the terminal on the visited session management network element may include session data of the terminal. For example, the session data of the terminal may be a DNN, S-NSSAI, an IP address, an NSI, or the like.

For example, the first network element is a visited user plane network element. The data of the terminal on the visited user plane network element may be referred to as QoS flow data of the terminal. For example, the QoS flow data may be a bit rate (QoS flow bit rate), a packet delay, and a packet error rate of a QoS flow (a bit rate, a packet delay, and a packet error rate of a QoS flow), and a QoS flow latency.

For example, the first network element is a visited application network element. The data of the terminal on the application network element may also be referred to as service experience data. For example, the service experience data includes a service identifier, service experience, a TCP slide window size, and the like.

For example, the first network element or the second network element is a terminal. Data of the terminal includes a central processing unit (CPU) usage, a memory usage, a foreground service identifier, a background service identifier, and the like.

For example, the first network element is a visited policy control network element. The data of the terminal on the visited policy control network element includes: a data network name (DNN), single network slice selection assistance information (S-NSSAI), an IP address, network slice instance information (NSI), and the like. It should be noted that the foregoing embodiment is described by using an example in which the second network element is a home network element. In this case, when the first network element is a visited network element, the visited first network element and the home second network element may be network elements of a same type. However, if the second network element is also a visited network element, the visited first network element and the visited second network element may be different network elements. For example, the visited first network element is a visited access network element, and the visited second network element is a visited mobility management network element. Alternatively, the first network element is a visited mobility management network element, and the second network element is a visited session management network element.

In this embodiment of this application, the home PLMN identifier is used to determine a home PLMN network accessed by the terminal. The visited PLMN identifier is used to determine a visited PLMN network accessed by the terminal.

The home area information or the visited area information in this embodiment of this application may be any one or a combination of country information, city information, geographic area information, and network area information.

Specifically, for data of the terminal on each network element, refer to descriptions in Table 1.

TABLE 1

Data of the terminal on each network element

| Data | Type | Granularity | Data source | Purpose |
|---|---|---|---|---|
| Location or area information | Network data | Terminal (UE) | AMF network element/RAN | Service MOS model training |
| RSRP, RSRQ, power headroom, RSSI, and round trip time (RTT) | Minimization of drive test (MDT) data | | RAN | |
| Received interference power | MDT data | | | |
| >DNN | Network data | Session | SMF network element/AMF network element | Determine a DNN to which a service belongs |
| >S-NSSAI | Network data | | | Determine a slice to which a service belongs |
| >NSI | Network data | | | Determine a slice instance to which a service belongs |
| >>Application identifier | Service data | Service (Application) | AF network element/PCF network element | Service identifier |
| >>Service experience | Service data | | AF | Service experience and service MOS model training |
| >>IP 5-tuple | Service/Network data | | AF/UPF | Identify a service flow |
| >>QoS flow bit rate, packet delay, and packet error rate (QoS flow Bit Rate/Packet Delay/Packet Error Rate) | Network data | | UPF | Service MOS model training |
| >>Data volume for uplink/downlink, scheduled IP throughput for uplink/downlink, packet delay for downlink, and a packet loss rate for uplink/downlink | MDT data | | RAN | Service MOS model training |
| >>Average throughput, initial playout delay, buffer level, play list, media playout description information (MPD Information), playout delay for media start-up, and device information | QoE data | | | |

Step 103: The first network element sends the data of the terminal on the first network element to the first data analytics network element.

For example, if the first network element is an AMF network element, step 103 may be specifically implemented in the following manner: The first network element may send the data of the terminal on the visited AMF network element to the first data analytics network element by using Namf_EventExposure_Notify.

For example, if the first network element is an SMF network element, step 103 may be specifically implemented in the following manner: The first network element may send the data of the terminal on the visited SMF network element to the first data analytics network element by using Nsmf_EventExposure_Notify.

For example, if the first network element is a UPF network element, step 103 may be specifically implemented in the following manner: The first network element directly sends the data of the terminal on the visited UPF network element to the first data analytics network element by using Nupf_EventExposure_Subscribe. Alternatively, the visited UPF network element sends the data of the terminal on the visited UPF network element to the first data analytics network element by using the visited SMF network element.

If the first network element is a visited AF network element, step 103 may be specifically implemented in the following manner: The first network element sends the data of the terminal on the visited AF network element to the first data analytics network element by using Naf_EventExposure_Notify.

It should be understood that, if the first network element is a visited access network element, the data of the terminal on the visited access network element may be forwarded to the first data analytics network element by using a visited network management network element, the visited AMF network element, or the visited SMF network element.

In a possible embodiment, the first information in this embodiment of this application further includes any one or more of the following information: indication information used to indicate that the terminal is roaming, and a roaming scenario of a session of the terminal. The roaming scenario is home routed or local breakout.

It should be noted that if the terminal is in the local breakout roaming scenario, the first information may carry a home PLMN identifier or a home national destination code. If the terminal is in the home routed scenario, the first information includes a home PLMN identifier, a visited PLMN identifier, home area information, and visited area information.

Step 104: The first data analytics network element receives, from the visited first network element, the data of the terminal on the first network element. The data includes the first information and the first identifier.

Step 105: The first data analytics network element receives, from the second network element, the data of the terminal on the second network element. The data of the terminal on the second network element includes the first identifier.

For example, the second network element may alternatively be any one of an access network element, a terminal, a session management network element, a user plane network element, a policy control network element, or an application network element. The second network element may be a visited network element, or may be a home network element.

It should be noted that, if the method shown in FIG. 8 is applicable to the architecture shown in FIG. 7, the second network element is the visited network element. In this case, in the following embodiments, the first data analytics network element may be a visited data analytics network element, or may be a home data analytics network element. If the method shown in FIG. 8 is applicable to the architecture shown in FIG. 6, the second network element is a home network element, or may be a visited network element. In this case, in the following embodiments, the first data analytics network element may be a visited data analytics network element, or may be a home data analytics network element.

It should be understood that, when the second network element is any one of the access network element, the terminal, the session management network element, the user plane network element, the policy control network element, and the application network element, for a specific message used by the second network element to send the data of the terminal on the second network element to the first data analytics network element, refer to the descriptions of step 103.

If the second network element is also a home access network element, for the data of the terminal on the home access network element, refer to the data of the terminal on the visited access network element.

If the second network element is a home mobility management network element, for the data of the terminal on the home mobility management network element, refer to the data of the terminal on the visited mobility management network element.

If the second network element is a home session management network element, for the data of the terminal on the home session management network element, refer to the data of the terminal on the visited session management network element.

If the second network element is a home user plane network element, for the data of the terminal on the home user plane network element, refer to the data of the terminal on the visited user plane network element.

If the second network element is a home application network element, for the data of the terminal on the home application network element, refer to the data of the terminal on the visited application network element.

If the second network element is a home policy control network element, for the data of the terminal on the home policy control network element, refer to the data of the terminal on the visited policy control network element.

It should be understood that, if the second network element is a visited network element different from the first network element, for the data of the terminal on the visited second network element, refer to the data of the terminal on the first network element.

Step 106: The first data analytics network element associates, based on the first identifier, the data of the terminal on the first network element with the data of the terminal on the second network element, to obtain data of the terminal during roaming.

This embodiment of this application provides a roaming data processing method. According to the method, the first data analytics network element obtains the data of the terminal on the visited first network element and the data of the terminal on the second network element. The first data analytics network element associates, based on the first identifier, the data of the terminal on the visited first network element with the data of the terminal on the second network element. The first data analytics network element associates, based on the first identifier, data of the terminal on at least two network elements (the second network element or the visited first network element), where the data includes the first information. Therefore, the first data analytics network element subsequently obtains a data analysis result of the terminal during roaming based on a big data analysis technology and based on data that is of the terminal, that is on the at least two network elements, and that is obtained after association.

In a possible implementation, the first identifier includes at least one of the following information: an identifier of the first network element, an identifier of the second network element, an identifier allocated by the first network element to the terminal, an identifier allocated by the second network element to the terminal, an identifier of the terminal, an identifier of the session of the terminal, a session management context identifier of the terminal, an identifier of a flow of the terminal, an internet protocol IP 5-tuple, network instance information, and area information of the terminal.

In a possible implementation, the identifier of the flow of the terminal is an identifier of a flow of a service of the terminal.

The identifier of the first network element may be used to identify the first network element. For example, the first network element is an access network element, and the identifier of the first network element is a global RAN node ID, a global gNB ID, or an IP address of a RAN. If the IP address of the first network element is an internal IP address, the network instance information and the IP address are required to uniquely identify the first network element. The identifier of the access network element is used to uniquely identify the access network element. For example, the identifier of the access network element may be a global RAN Node ID which globally uniquely identifies a RAN.

The identifier of the second network element may be used to identify the second network element. For example, if the second network element is an access and mobility management function network element, the identifier of the second network element is a globally unique AMF identifier (GUAMI) or an IP address of an AMF. For example, if the second network element is a user plane function network element, the identifier of the second network element is a global UPF ID or an IP address of a UPF. For example, if the second network element is a terminal, the identifier of the second network element is an identifier of the terminal. If the IP address of the first network element is an internal IP address, a network instance and the IP address are required to uniquely identify the first network element.

It should be understood that, the identifier allocated by the first network element to the terminal is unique on the first network element, and the identifier allocated by the second network element to the terminal is unique on the second network element. Therefore, for example, the data of the terminal on the first network element and the data of the second network element (including the data of the terminal on the second network element) can be correctly associated only by combining the identifier of the first network element or the identifier of the second network element.

The identifier of the session of the terminal may be used to identify a session of the terminal. The session of the terminal may be a packet data unit (PDU) in a 5G network, or a public data network (PDN) connection in a 4G network. For example, the identifier of the session of the terminal may be a PDU session ID. For example, the identifier of the session of the terminal may be a default bearer identifier in the PDN connection.

The identifier of the flow of the terminal is used to identify a flow of a service of the terminal. For example, the identifier of the flow of the terminal may be a quality of service flow (QoS flow) identifier (QoS Flow ID). For example, the identifier of the flow of the terminal may be a bearer identifier. For example, the flow of the terminal may alternatively be a service template flow identifier (Service Data Flow Identifier, SDF ID).

It should be noted that an identifier of any network element (for example, the first network element, the second network element, the AMF network element, the SMF network element, or the UPF network element) in this embodiment of this application is specifically an ID of the network element or an IP address of the network element.

For example, the identifier of the terminal in this embodiment of this application may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), an IP address, and a mobile subscriber international integrated services digital network number (MSISDN). For the identifier of the terminal in the following embodiments, refer to the descriptions herein.

For example, in this embodiment of this application, the area information, the home area information, or the visited area information of the terminal may be one or more of the following information of an area in which the terminal is located: a tracking area identifier (TAI), a list of tracking area identifiers (list of TAI(s)), a routing area identifier (RAI), a list of routing area identifiers (list of RAI(s)), a cell identifier (Cell ID), a list of cell identifiers (list of Cell ID(s)), a geographic area identifier, a network code (NC), a country code (CC), a city code, and a county cod. For the area information, the home area information, or the visited area information of the terminal in the following embodiments, refer to the descriptions herein.

In this embodiment of this application, the identifier allocated by the first network element to the terminal is an identifier allocated by the first network element to the terminal on a first interface. The identifier allocated by the second network element to the terminal is an identifier allocated by the second network element on a second interface. The first interface is an interface between the first network element and the second network element.

Example (1): The first network element is a visited mobility management network element, and the second network element is a visited access network element. In this case, the first interface is an interface between the visited access network element and the visited mobility management network element.

For example, the first interface may be an N2 interface. That is, the visited access network element and the visited mobility management network element each allocate a unique identifier to the terminal on the N2 interface. For example, the visited access network element allocates an identifier of RAN UE NGAP ID to the terminal on the N2 interface, and the visited mobility management network element allocates an identifier of AMF UE NGAP ID to the terminal on the N2 interface. The identifier allocated by the visited access network element to the terminal on the N2 interface is used to uniquely identify a tunnel identifier of an access network element of a terminal. The identifier allocated by the visited mobility management network element to the terminal on the N2 interface is used to uniquely identify a tunnel identifier of a mobility management network element of a terminal. It should be understood that the example (1) is applicable to the scenario shown in FIG. 7.

Example (2): The first network element is a visited session management network element, and the second network element is a home session management network element. In this case, in this embodiment of this application, the first interface is an interface between the home session management network element and the visited session management network element. For example, the second interface may be an N16 interface.

It should be understood that the example (2) is applicable to the scenario shown in FIG. 6.

Example (3): The first network element is an access network element, and the second network element is a visited user plane network element. In this case, the first interface may be an N3 interface between the RAN and the UPF network element in the system shown in FIG. 4. That is, the access network element and the UPF network element each allocate an identifier, AN Tunnel Info, and CN Tunnel Info to the terminal on the N3 interface. The AN Tunnel Info includes an IP address of the RAN and a tunnel endpoint identifier (TEID) allocated by the RAN to a session of the terminal. The CN Tunnel Info includes an IP address of the UPF network element and a tunnel endpoint identifier (TEID) allocated by the SMF network element or the UPF network element to a session of the terminal.

It should be understood that the example (3) is applicable to the scenario shown in FIG. 7.

Example (4): The second network element is a terminal. In this case, the first interface may be a Uu interface between the RAN and the terminal in the system shown in FIG. 4, that is, the terminal and the access network element each allocate an identifier to the terminal on the Uu interface. The identifier allocated by the access network element to the terminal on the Uu interface may be a cell radio network temporary identifier (C-RNTI).

It should be noted that after allocating the identifier to the terminal on the first interface, the access network element may send, to the second network element (for example, the mobility management network element, the session management network element, the terminal, or the user plane network element), the identifier allocated by the access network element to the terminal on the first interface. After allocating the identifier to the terminal on the first interface, the second network element may send, to the access network element, the identifier allocated by the second network element to the terminal on the first interface.

In a possible embodiment, as shown in FIGS. 8A-D, after step 106, the method provided in this embodiment of this application may further include the following steps.

Step 107: The first data analytics network element sends, to the second data analytics network element, the data of the terminal during roaming.

Step 108: The second data analytics network element receives, from the first data analytics network element, the data of the terminal during roaming.

In a possible implementation, step 101 in this embodiment of this application may be specifically implemented in the following manner: When the terminal roams to a visited area, the visited first network element obtains the home PLMN identifier of the terminal based on the identifier of the terminal. If the first network element determines that the home PLMN identifier of the terminal is inconsistent with a PLMN identifier of the first network element, the first network element determines that the terminal is roaming. It should be understood that if the home PLMN identifier of the terminal is inconsistent with the PLMN identifier of the first network element, the first network element may determine that the terminal is in an inter-PLMN roaming scenario.

For example, the first network element may obtain the home PLMN identifier of the terminal in the following manner: When the terminal roams to the visited area, the terminal sends a registration request message to a visited mobility management network element. The registration request message may carry the home PLMN identifier of the terminal. If the first network element is a visited mobility management network element, the first network element may obtain the home PLMN identifier of the terminal from the registration request message. If the first network element is a visited session management network element, the first network element may obtain the home PLMN identifier of the terminal from the visited mobility management network element.

Specifically, the registration request message carries an identifier SUPI of the terminal. The SUPI includes an international mobile subscriber identity (IMSI) and a network private identity. The IMSI includes a mobile country code (MCC), a mobile network code (MNC), and a mobile subscriber identification number (MSIN). The PLMN identifier includes the MCC and the MNC. Therefore, the visited first network element may compare whether the MCC and the MNC in the SUPI and an MCC and an MNC in the PLMN identifier of the network element are consistent, and determine whether the terminal is roaming.

In another possible implementation, step 101 in this embodiment of this application may be specifically implemented in the following manner: When the terminal roams to the visited area, the visited first network element obtains the home PLMN identifier of the terminal based on the identifier of the terminal. The first network element queries, from the UDM network element or the UDR network element based on the identifier of the terminal, a GPSI corresponding to the identifier of the terminal. The GPSI includes an MSISDN. The visited first network element (for example, the AMF network element) determines a home area of the terminal by using the mobile subscriber international ISDN number (MSISDN), and compares area information of the (visited) network element, to further compare city information in the MSISDN and determine that the terminal is in inter-region roaming in a same PLMN.

For example, the MSISDN includes a country code (for example, 86 stands for China), a national destination code (NDC), and a subscriber number (SN). The (visited) network element may determine, by using the NDC code (3 digits) and the first four digits of the SN, a home area in which the terminal is located.

It should be noted that in this embodiment of this application, the first network element or the second network element may actively decide to send the data of the terminal on the first network element or the second network element to the first data analytics network element. That is, once the first network element or the second network element determines that the terminal in the coverage of the first network element or the second network element is roaming, the first network element or the second network element may actively send the data of the terminal on the first network element or the second network element to the first data analytics network element. On the other hand, as requested by the first data analytics network element, the first network element and the second network element may determine to send the data of the terminal on the first network element or the second network element to the first data analytics network element.

In an optional embodiment, as shown in FIGS. 8A-D, before step 101, the method provided in this embodiment of this application further includes the following steps.

Step 109: The first data analytics network element sends a first request message to the first network element/second network element. The first request message is used to request the data of the terminal on the first network element/second network element during roaming.

For example, if the first network element/second network element is an AMF network element, the first request message may be Namf_EventExposure_Subscribe, or the first request message may be carried in Namf_EventExposure_Subscribe that is sent by the first data analytics network element to the first network element.

If the first network element/second network element is an SMF network element, the first request message may be Nsmf_EventExposure_Subscribe, or the first request message may be carried in Nsmf_EventExposure_Subscribe that is sent by the first data analytics network element to the first network element/second network element.

If the first network element/second network element is a UPF network element, the first data analytics network element first sends Namf_EventExposure_Subscribe to the SMF network element. Namf_EventExposure_Subscribe carries the first request message. Then, the SMF network element sends the first request message to the UPF network element by using an N4 session modification message.

If the first network element/second network element is an AF network element, the first request message is Naf_EventExposure_Subscribe, or Naf_EventExposure_Subscribe carries the first request message.

Step 110: The first network element receives the first request message from the first data analytics network element.

It should be noted that, in step 109 and step 110, the first data analytics network element indicates the first network element to report data of the terminal on the first network element to the first data analytics network element, once the first network element finds a roaming terminal. When sending the first request message, the first data analytics network element does not know an identifier of the roaming terminal. Based on step 109 and step 110, once determining a roaming terminal, the first network element may perform step 102 and step 103.

It should be noted that if the first network element actively reports the data of the terminal on the first network element to the first data analytics network element, step 109 and step 110 may be omitted.

For example, the first request message may include any one or more of the following information: a terminal type, area information, and time information. Therefore, the first network element can determine a range for collecting roaming data of the terminal on the first network element.

It should be understood that the terminal type is used by the first network element to determine to collect data of a terminal of a specified terminal type on the first network element. The terminal type can be distinguished by an operating system of the terminal. For example, the terminal type may be a terminal with an iOS system, a terminal with an Android system, or a terminal with a Windows system. For example, if the terminal type carried in the first request message is a terminal with the Windows system, and if the visited first network element determines that both a terminal with the Android system and a terminal with the Windows system are roaming, the visited first network element reports, to the first data analytics network element, data of the terminal with the Windows system on the visited first network element.

The area information may be a tracking area (TA, identified by TAI), a TA list (identified by TAI list), a routing area (RA, identified by RAI), an RA list (identified by RAI list), a cell (identified by CGI or cell ID), or a cell list (identified by CGI list or Cell ID list). The TA list includes at least one TA. The RA list includes at least one RA.

For example, the time information may be a time window or a time period list. The time information is used by the first network element to determine a start time and an end time for collecting the data of the terminal on the first network element, for example, from Mar. 1, 2019 to Mar. 8, 2019. The time information may be a start time and a time length, or the start time and the end time. The time information may indicate one time period, or may indicate a plurality of inconsecutive time periods.

It should be understood that the area information, the time information, and the terminal type included in the request may all exist, and based on the area information, the time information, and the terminal type, the first network element determines a range for collecting the data of the terminal on the first network element, or only one type may exist. This is not limited in this embodiment of this application. For example, if the request includes the area information, the time information, and the terminal type, the area information is a TA 1, the time information is from Mar. 1, 2019 to Mar. 8, 2019, and the terminal type is a terminal with the Android system, the first network element may determine to collect data of the terminal with the Android system in the TA 1 on the first network element between Mar. 1, 2019 and Mar. 8, 2019.

In a possible implementation, the first request message may further include first indication information, and the first indication information is used to indicate to report data when the terminal is roaming. The first request message helps the first network element determine that the data of the terminal during roaming needs to be reported.

It should be noted that, in step 109 and step 110, that the first data analytics network element triggers the first network element to report the data of the roaming terminal on the first network element is described by using the first network element as an example. For a process in which the first data analytics network element triggers the second network element to report the data of the roaming terminal on the second network element, refer to step 109 and step 110. If the first data analytics network element triggers the second network element, the first network element in step 109 and step 110 may be replaced with the second network element.

In another possible embodiment, as shown in FIGS. 8A-D, before step 101, the method provided in this embodiment of this application further includes the following steps.

Step 111: The second data analytics network element sends a second request message to the first data analytics network element. The second request message is used to request the first data analytics network element to report the data of the terminal in the roaming scenario on the visited network element.

Step 112: The first data analytics network element receives the second request message from the second data analytics network element.

It should be understood that step 111 and step 112 are applicable to a scenario in which the first data analytics network element and the second data analytics network element are data analytics network elements of a same operator. In an implementation process, if the first data analytics network element and the second data analytics network element are data analytics network elements of different operators, if the first data analytics network element and the second data analytics network element can communicate with each other, step 111 and step 112 are also applicable. In addition, if negotiation has been made between the first data analytics network element and the second data analytics network element or the first data analytics network element may actively obtain the data of the terminal in the roaming scenario on the visited network element, step 111 and step 112 may be omitted.

In an optional embodiment, before the first data analytics network element sends the first request message to the first network element or the second network element, the first data analytics network element further needs to determine the address or the identifier of the first network element and the address or the identifier of the second network element. Specifically, that the first data analytics network element determines the address or the identifier of the first network element or the address or the identifier of the second network element may be specifically implemented in the following manner: The first data analytics network element sends a query request to the NRF network element. The query request includes at least one of the following information: area information, a data analysis result identifier (analytic ID), a terminal group identifier, and a terminal type.

In an optional embodiment, as shown in FIGS. 8A-D, before step 107, the method provided in this embodiment of this application further includes the following steps.

Step 113: The first data analytics network element determines, from a user data management network element, information about the second data analytics network element.

For example, the information about the second data analytics network element may be an identifier or an address of the second data analytics network element.

In a possible implementation, step 103 in this embodiment of this application may be specifically implemented in the following manner: The first data analytics network element sends a third request message to the user data management network element. The third request message is used to request the information about the second data analytics network element, and the third request information includes one or more of the following information: the identifier of the terminal, the home PLMN identifier, and a home area. The first data analytics network element receives the information of the second data analytics network element from the user data management network element.

For example, the information about the second data analytics network element may be the identifier or an IP address of the second data analytics network element.

For example, if the first data analytics network element is a visited data analytics network element, the user data management network element may be a home user data management network element, and the second data analytics network element may be a home data analytics network element. If the first data analytics network element is a home data analytics network element, the user data management network element may be a visited user data management network element, and the second data analytics network element may be a visited data analytics network element. In this case, the home PLMN identifier in the third request message is replaced with the visited PLMN identifier, and the home area is replaced with a visited area.

In the foregoing embodiment, an example in which the first network element is a visited access network element and the second network element is a mobility management network element is used to describe a process in detail in which the first data analytics network element or the second data analytics network element associates the data of the terminal on the visited access network element with the data of the terminal on the visited mobility management network element or the home mobility management network element. In an actual process, the first data analytics network element or the second data analytics network element may further associate the data of the terminal on the mobility management network element with the data of the terminal on the session management network element.

To associate the data of the terminal on the mobility management network element with the data of the terminal on the session management network element, the data of the terminal on the mobility management network element further includes a second identifier, used to associate the data of the terminal on the mobility management network element with the data of the terminal on the session management network element. The session management context identifier is a session identifier uniquely allocated on the session management network element to the terminal, and identifies a unique session on the session management network element. The SM context ID is allocated by the session management network element to a session of the terminal, and then sent to the mobility management network element to identify session information of the terminal. Still with reference to FIGS. 8A-D, in a possible embodiment, the method provided in this embodiment of this application further includes the following steps.

Step 114: The first data analytics network element obtains the data of the terminal on the session management network element. The data of the terminal on the session management network element includes the second identifier.

It should be noted that, for the scenario shown in FIG. 6, the session management network element in step 114 and step 115 may be a visited session management network element, or may be a home session management network element. For the scenario shown in FIG. 7, the session management network element in step 114 and step 115 may be a visited session management network element.

It should be noted that in this embodiment of this application, that the session management network element sends the data of the terminal on the session management network element to the first data analytics network element may be implemented in the following manner:

Manner 1: The session management network element may directly send the data of the terminal on the session management network element to the first data analytics network element.

Manner 2: The session management network element may send the data of the terminal on the session management network element to the user plane network element, and the user plane network element sends the data of the terminal on the session management network element to the first data analytics network element.

An advantage of the manner 2 is that complexity of associating data by the first data analytics network element can be reduced, and an accuracy rate of associating the data by the first data analytics network element can be increased.

Step 115: The first data analytics network element associates, based on the second identifier, the data of the terminal on the mobility management network element with the data of the terminal on the session management network element.

It should be understood that, after step 104 to step 106, the data analytics network element may associate the data of the terminal on the visited access network element with the data of the terminal on the mobility management network element based on the first identifier, and associate obtained data with the data of the terminal on the session management network element by using the second identifier.

For example, as shown in Table 1, the data of the terminal on the mobility management network element may be any one or more of location information, a DNN, an NSI, and S-NSSAI of the terminal. For example, the location information of the terminal may be geographical location information or area information of the terminal, and the data of the terminal on the session management network element may be any one or more of the DNN, the S-NSSAI, or the NSI shown in Table 1. It may be understood that the data of the terminal on the session management network element may be the same as or different from the data of the terminal on the mobility management network element. That the data of the terminal on the session management network element is different from the data of the terminal on the mobility management network element means that the data of the terminal on the session management network element and the data of the terminal on the mobility management network element are partially the same and partially different.

It should be noted that although the data of the terminal on the session management network element and the data of the terminal on the mobility management network element may be data of a same type, the data of the terminal on the session management network element and the data of the terminal on the mobility management network element may vary due to a difference in an information collection range (for example, a time window and area information). For example, the type is the DNN. If the data of the terminal on the session management network element and the data of the terminal on the mobility management network element are DNNs, the DNN of the terminal on the session management network element may be a DNN corresponding to the terminal in a time period 1, and the DNN of the terminal on the mobility management network element may be a DNN corresponding to the terminal in a time period 2. In this way, the first data analytics network element may associate, based on the first identifier, data of the terminal on different network elements in different collection ranges, to obtain a complete data set of the terminal. For an example in which the type is the S-NSSAI or the NSI, refer to the example in which the type is the DNN.

In a possible example, the second identifier in this embodiment of this application includes at least one of the following information: a session management context identifier (SM Context ID) of the terminal, an identifier of the mobility management network element, an identifier of the session management network element, a cell global identifier (Cell Global ID, CGI), the identifier of the terminal, and the identifier of the session of the terminal. The CGI is used to globally uniquely identify a cell, that is, a cell in which the terminal is located.

For example, the identifier of the session management network element may be an address of the session management network element or an ID of the session management network element. The ID of the session management network element is used to globally uniquely identify a session management network element.

It should be understood that the SM context ID of the terminal is unique only in the session management network element. Therefore, optionally, the data of the terminal on the mobility management network element and the data of the terminal on the session management network element can be correctly associated only by combining at least one of the SM context ID of the terminal and the identifier of the session management network element or the identifier of the mobility management network element.

To associate the data of the terminal on the session management network element with data of the terminal on the user plane network element, in this embodiment of this application, the data of the terminal on the session management network element further includes a third identifier, used to associate the data of the terminal on the session management network element with the data of the terminal on the user plane network element. With reference to FIGS. 8A-D, in another possible embodiment, the method provided in this embodiment of this application further includes the following steps.

Step 116: The first data analytics network element obtains the data of the terminal on the user plane network element. The data of the terminal on the user plane network element includes the third identifier.

It should be noted that, for the scenario shown in FIG. 6, the user plane network element in step 116 and step 117 may be a visited user plane network element, or may be a home user plane network element. For the scenario shown in FIG. 7, the user plane network element in step 116 and step 117 may be a visited user plane network element.

For example, the third identifier includes at least one of the following information: the identifier allocated by the session management network element to the session of the terminal, the identifier of the session management network element, the identifier of the user plane network element, the identifier of the session of the terminal, the identifier of the flow of the terminal, and the identifier of the terminal.

For example, the identifier allocated by the session management network element to the session of the terminal is an identifier allocated by the session management network element to the session of the terminal on a second interface. The second interface is an interface between the session management network element and the user plane function network element. For example, as shown in FIG. 4, the interface between the session management network element and the user plane function network element may be an N4 interface, and the identifier allocated by the session management network element to the session of the terminal on the second interface is an N4 session ID.

For example, the data of the terminal on the user plane network element may be QoS flow data shown in Table 1 when the terminal uses a service. The QoS flow data may be a bit rate, a packet loss rate (e.g., Packet Delay), and a packet error rate of the QoS flow.

For example, in step 116, the first data analytics network element may obtain the data of the terminal on the user plane network element in the following manner. (A) a1. The first data analytics network element sends a data request message to the user plane network element by using the session management network element. b1. After receiving the data request message from the first data analytics network element, the session management network element sends the data request message to the user plane network element by using an N4 message. c1. The user plane network element obtains the data of the terminal on the user plane network element based on the data request message. d1. The user plane network element reports the data of the terminal on the user plane network element to the first data analytics network element through a service-oriented interface. Alternatively, a manner (B) includes a1-c1, and d2. d2. The user plane network element reports the data of the terminal on the user plane network element to the session management network element by using an N4 message, and the session management network element further reports the data of the terminal on the user plane network element to the first data analytics network element through a service-oriented interface. (C) The first data analytics network element directly sends a data request message to the user plane network element.

Step 117: The first data analytics network element associates, based on the third identifier, the data of the terminal on the session management network element with the data of the terminal on the user plane network element.

It should be understood that, the identifier allocated by the session management network element to the session of the terminal on the second interface is the N4 Session ID, and the N4 Session ID is unique only on the session management network element. Therefore, in an example, the data of the terminal on the session management network element and the data of the terminal on the user plane network element can be correctly associated only by combining at least one of the N4 session ID of the terminal and the identifier of the session management network element or the identifier of the user plane network element.

To associate the data of the terminal on the user plane network element with the data of the terminal on the application network element, in this embodiment of this application, the data of the terminal on the user plane network element includes a fourth identifier, used to associate the data of the terminal on the user plane network element with the data of the terminal on the application network element. Still with reference to FIGS. 8A-D, in still another possible embodiment, the method provided in this embodiment of this application further includes the following steps.

Step 118: The first data analytics network element obtains the data of the terminal on the application network element. The data of the terminal on the application network element includes the fourth identifier.

For example, the data of the terminal on the application network element may be service experience data shown in Table 1.

For example, for a process in which the first data analytics network element obtains the data of the terminal on the application network element in step 118, refer to descriptions in the prior art.

It should be noted that, for the scenario shown in FIG. 6, the application network element in step 118 and step 119 may be a visited application network element, or may be a home application network element. For the scenario shown in FIG. 7, the application network element in step 118 and step 119 may be a visited application network element.

Step 119: The first data analytics network element associates, based on the fourth identifier, the data of the terminal on the user plane network element with the data of the terminal on the application network element.

For example, the fourth identifier in this embodiment of this application may include at least one of the following information: an internet protocol 5-tuple (IP 5-tuple), the identifier of the terminal, the identifier of the user plane network element, a service identifier of a service, an identifier of a service server, and an identifier of the application network element.

It should be noted that in this embodiment of this application, when the user plane network element reports the data of the terminal on the user plane network element to the first data analytics network element, a carried IP 5-tuple is an internal IP 5-tuple, and when the application network element reports the data of the terminal on the application network element to the first data analytics network element, a carried IP 5-tuple is an external IP 5-tuple. Therefore, to associate the two parts of data in step 119, an IP address needs to be translated by using a network address translation (NAT) function entity. Specifically, there are the following three concepts:

(1) When the user plane network element reports the data of the terminal on the user plane network element to the first data analytics network element, the data carries an internal IP 5-tuple, and the first data analytics network element queries, from a NAT network element based on the internal IP 5-tuple, an external IP 5-tuple corresponding to the internal IP 5-tuple. After the external IP 5-tuple corresponding to the internal IP 5-tuple is obtained, if the external IP 5-tuple corresponding to the internal IP 5-tuple and an external IP 5-tuple sent by the application network element are the same, the first data analytics network element associates the data of the terminal on the user plane network element with the data of the terminal on the application network element based on the external IP 5-tuple.

For example, an alternative implementation is as follows: The first data analytics network element may alternatively query, from the NAT network element based on an external IP 5-tuple carried in the data of the terminal on the application network element, an internal IP 5-tuple corresponding to the external IP 5-tuple. If the internal IP 5-tuple corresponding to the external IP 5-tuple is consistent with an internal IP 5-tuple carried in the data of the terminal on the user plane network element, the first data analytics network element associates the data of the terminal on the user plane network element with the data of the terminal on the application network element based on the internal network IP 5-tuple.

(2) The user plane network element queries, from a NAT network element based on an internal IP 5-tuple, an external IP 5-tuple corresponding to the internal IP 5-tuple, and when the user plane network element reports the data of the terminal on the user plane network element, the user plane network element reports the external IP 5-tuple corresponding to the internal IP 5-tuple to the first data analytics network element. In this way, the first data analytics network element can receive the external IP 5-tuple carried in the data of the terminal on the user plane network element, and associate the data of the terminal on the user plane network element with the data of the terminal on the application network element based on the external IP 5-tuple.

For example, an alternative implementation is as follows: The application network element queries, from the NAT network element based on an external IP 5-tuple, an internal IP 5-tuple corresponding to the external IP 5-tuple, and when the application network element reports the data of the terminal on the application network element, the data carries the internal IP 5-tuple corresponding to the external IP 5-tuple. In this way, the first data analytics network element can receive the internal IP 5-tuple carried in the data of the terminal on the application network element, and associate the data of the terminal on the user plane network element with the data of the terminal on the application network element based on the internal IP 5-tuple.

(3) The data of the terminal on the user plane network element carries an internal IP 5-tuple, and the data of the terminal on the application network element carries an external IP 5-tuple. The first data analytics network element associates the data of the terminal on the user plane network element with the data of the terminal on the application network element based on a correspondence between the internal IP 5-tuple and the external IP 5-tuple.

It should be understood that the first data analytics network element has the correspondence between the internal IP 5-tuple and the external IP 5-tuple. The correspondence may be pre-stored in the first data analytics network element, or may be obtained by the first data analytics network element from the NAT network element. Specifically, that the first data analytics network element obtains the correspondence from the NAT network element includes: The NAT network element actively reports the correspondence to the first data analytics network element, or the NAT network element sends the correspondence to the first data analytics network element as requested by the first data analytics network element.

It should be noted that in this embodiment of this application, when the first data analytics network element obtains data of the terminal on any network element, when the network element reports the data, the network element may include the first identifier, the second identifier, the third identifier, or the fourth identifier to the data of the terminal on the network element. Certainly, when reporting the data of the terminal on the network element, the network element may further report the data of the terminal on the network element and the first identifier, the second identifier, the third identifier, or the fourth identifier in a same message to the first data analytics network element.

In a possible implementation, the first identifier, the second identifier, the third identifier, and the fourth identifier may further include time information or a trace recording session reference. The time information is used to indicate a valid time period, a time interval, a slot, a time window, a timestamp, or a time point of the first identifier, the second identifier, the third identifier, and the fourth identifier. The trace recording session reference is used to indicate a trace record of the terminal.

It should be noted that, if the terminal is in inter-region roaming in a same PLMN, and the first data analytics network element is a home data analytics network element, the visited access network element, the visited session management network element, the visited mobility management network element, the visited policy control network element, the visited application network element, and the visited user plane network element are network elements of a same operator. However, these network elements are distributed in different countries, provinces, or urban areas.

It should be noted that, if the terminal is in inter-PLMN roaming, and the first data analytics network element is a home data analytics network element, the visited access network element, the visited session management network element, the visited mobility management network element, the visited policy control network element, the visited application network element, and the visited user plane network element are network elements of a same operator, and are located in a PLMN different from that in which the home data analytics network element is located.

In addition, regardless of whether the home data analytics network element or the visited data analytics network element associates data of the terminal on at least two network elements, in the scenario shown in FIG. 6, the second network element (for example, the mobility management network element), the session management network element in step 114 and step 115, the policy control network element, the application network element in step 118 and step 119, and the user plane network element in step 116 and step 117 may all be corresponding visited network elements, or may be corresponding home network elements. However, in the scenario shown in FIG. 7, the second network element (for example, the mobility management network element), the session management network element in step 114 and step 115, the policy control network element, the application network element in step 118 and step 119, and the user plane network element in step 116 and step 117 may all be corresponding visited network elements.

In addition, for the scenario shown in FIG. 6, if the second network element is a home mobility management network element, the first data analytics network element may associate the data of the terminal on the visited access network element with the data of the terminal on the home mobility management network element.

In another embodiment of this application, if the visited first network element and the home second network element are same network elements, the first data analytics network element may associate the data of the terminal on the visited first network element with the data of the terminal on the home second network element. For example, the first network element is a visited access network element. The second network element is a home access network element. Alternatively, the first network element is a visited mobility management network element, and the second network element is a home mobility management network element. Alternatively, the first network element is a visited session management network element, and the second network element is a home session management network element. Alternatively, the first network element is a visited user plane network element, and the second network element is a home user plane network element. Alternatively, the first network element is a visited application network element, and the second network element is a home application network element. Alternatively, the first network element is a visited policy control network element, and the second network element is a home policy control network element.

In the foregoing Embodiment 1, a process of obtaining complete service MOS model training data is described by using step 101 to step 119 and by using an example in which the first network element is a visited access network element, and the second network element is a mobility management network element. In the process, the first data analytics network element sequentially associates two of the data of the terminal on the access network element, the data of the terminal on the mobility management network element, the data of the terminal on the session management network element, the data of the terminal on the visited or home user plane network element, and the data of the terminal on the application network element, to finally obtain the complete service MOS model training data. In the following Embodiment 2, how the first data analytics network element implements the following two association processes is described in detail with reference to FIGS. 9A-B and by using an example in which the first network element is a visited access network element and the second network element is a user plane network element:

Association process 1: Sequentially associate two of the data of the terminal on the visited access network element, the data of the terminal on the visited or home user plane network element, and the data of the terminal on the visited or home application network element, to finally obtain complete data of the terminal on the visited access network element, the visited or home user plane network element, and the visited or home application network element. Optionally, the associated data may be used for service MOS model training.

Association process 2: The first data analytics network element sequentially associates two of the data of the terminal on the visited access network element, the data of the terminal on the visited or home user plane network element, the data of the terminal on the visited or home session management network element, and the data of the terminal on the visited or home mobility management network element, to finally obtain complete data of the terminal on the visited access network element, the visited or home user plane network element, the visited or home session management network element, and the visited or home mobility management network element. Optionally, the associated data may be used for service MOS model training.

Figure 9A:
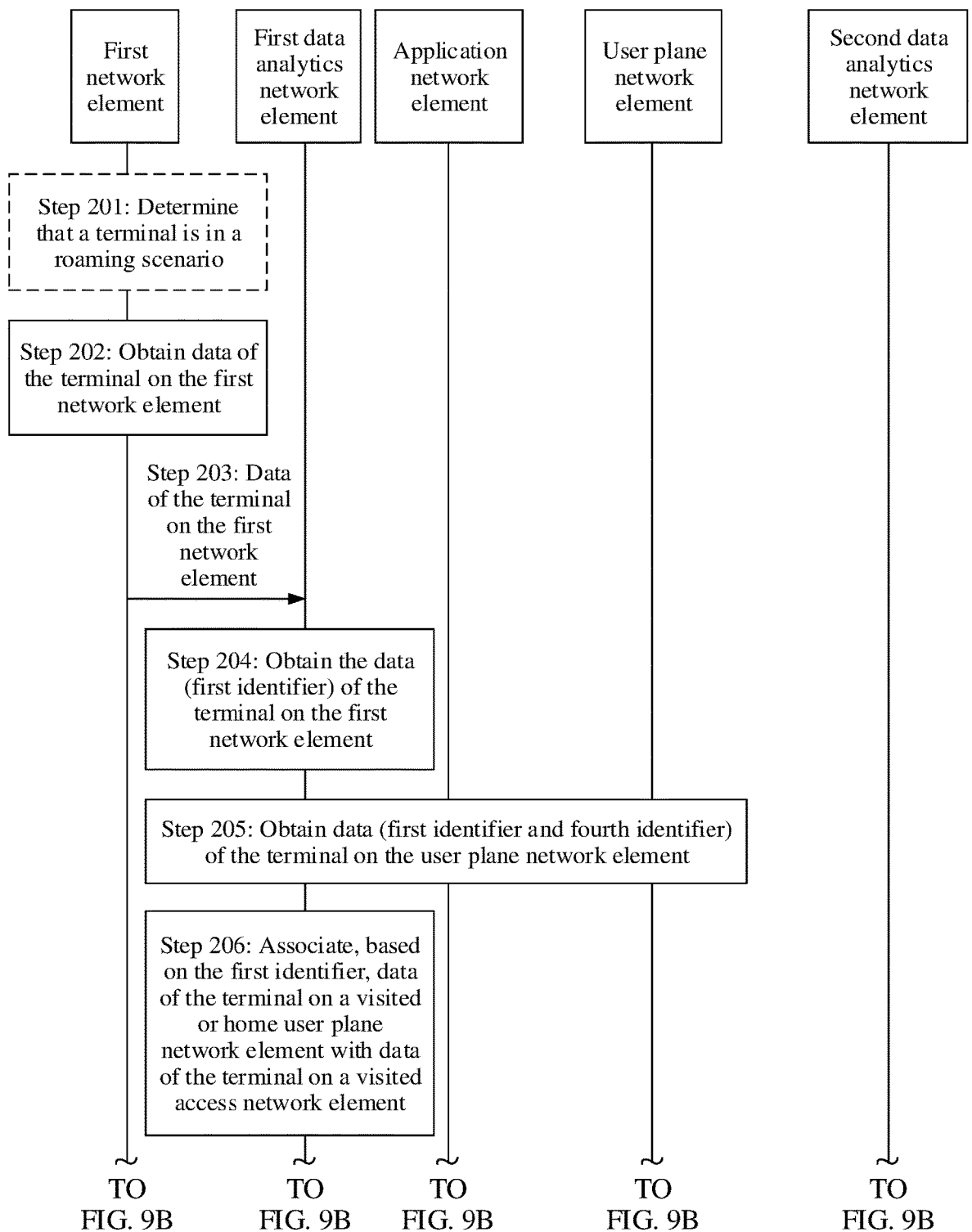
FIG. 9A and FIG. 9B are example schematic flowcharts of another roaming data processing method according to an embodiment of this application.
Figure 9B:
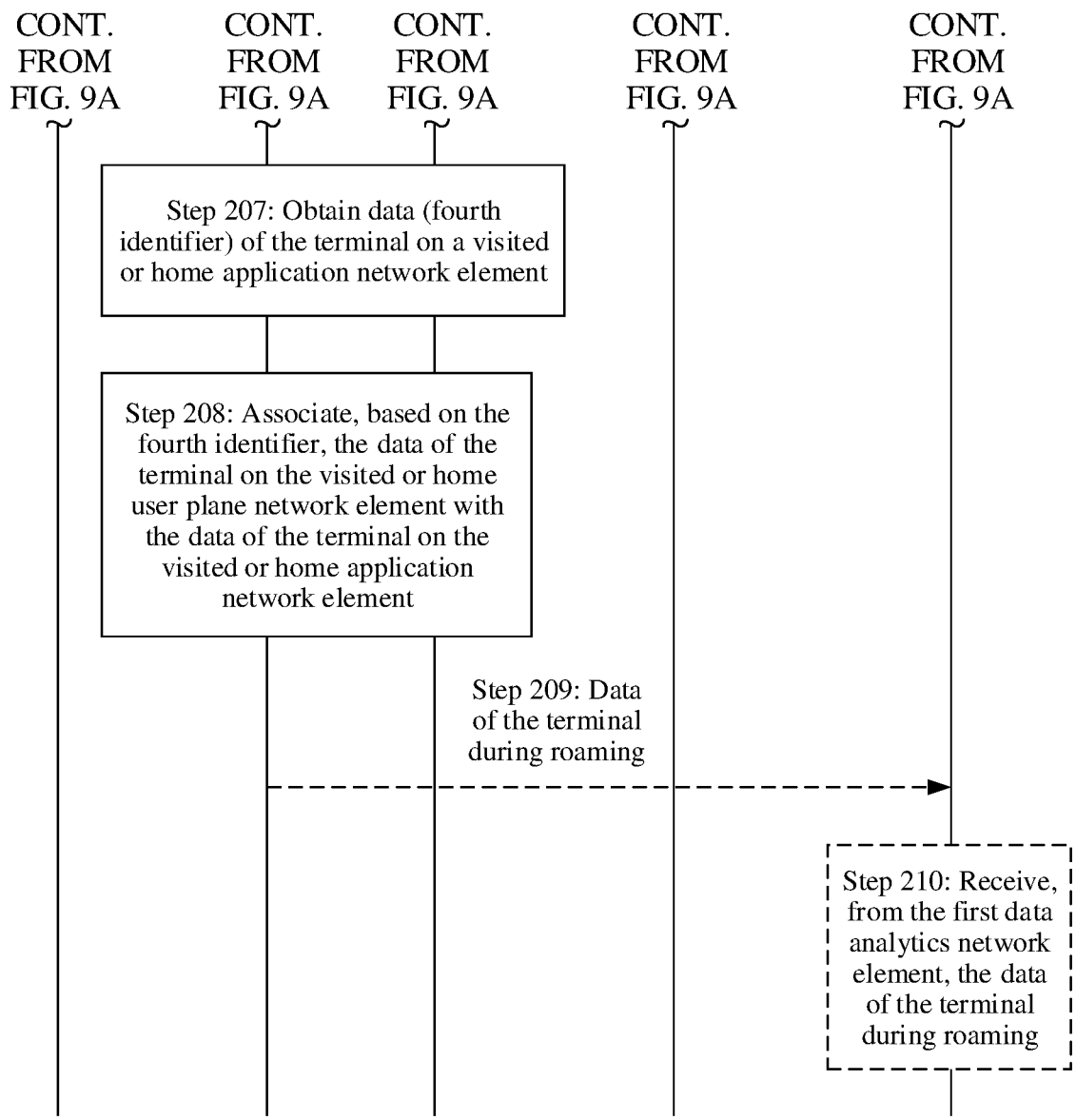

As shown in FIGS. 9A-B, an embodiment of this application provides another roaming data processing method. The method includes the following steps.

Step 201 to step 205 are the same as the descriptions of step 101 to step 105 in the foregoing embodiment.

Step 206: The first data analytics network element associates, based on the first identifier, the data of the terminal on the first network element with data of the terminal on a visited or home user plane network element, to obtain data of the terminal during roaming.

For example, the first identifier further includes at least one of the following information: an identifier of the first network element, an identifier of the second network element, an identifier of the terminal, network instance information, and area information of the terminal. A difference between step 101 to step 106 and step 201 to step 206 lies in that, in step 201 to step 206, the second network element is a visited or home user plane network element, and the identifier allocated by the first network element to the terminal is an identifier allocated by a visited access network element to the terminal. The identifier allocated by the second network element to the terminal is an identifier allocated by the visited or home user plane network element to the terminal.

For example, the second network element is the visited or home user plane network element. In this case, the data of the terminal on the visited access network element can be associated with the data of the terminal on the visited or home user plane network element.

In a possible example, after the first data analytics network element associates the data of the terminal on the visited access network element with the data of the terminal on the visited or home user plane network element, to associate the data of the terminal on the visited or home user plane network element with data of the terminal on a visited or home application network element, in this embodiment of this application, the data of the terminal on the visited or home user plane network element further includes a fourth identifier. The fourth identifier is used to associate data of the terminal in a visited or home user plane with the data of the terminal on the visited or home application network element.

Correspondingly, still with reference to FIGS. 9A-B, in a possible embodiment of this application, the method provided in this embodiment of this application further includes the following steps.

Step 207: The first data analytics network element obtains the data of the terminal on the visited or home application network element. The data of the terminal on the visited or home application network element includes the fourth identifier.

Step 208: The first data analytics network element associates the data of the terminal on the visited or home user plane network element with the data of the terminal on the visited or home application network element based on the fourth identifier.

In a possible implementation, the fourth identifier may further include at least one of the following information: an IP 5-tuple, the identifier of the terminal, an identifier of the visited or home user plane network element, a service identifier of a service, an identifier of a service server, and an identifier of an application network element.

It should be understood that the first data analytics network element can implement the foregoing association process 1 by using step 201 to step 208. In a possible implementation, the method provided in this embodiment of this application further includes step 209: The first data analytics network element sends, to a second data analytics network element, the data of the terminal during roaming Step 210: The second data analytics network element receives, from the first data analytics network element, the data of the terminal during roaming. The data of the terminal during roaming includes the data obtained by the first data analytics network element by associating the network elements in step 201 to step 208.

In another possible example, after the first data analytics network element associates the data of the terminal on the visited access network element with the data of the terminal on the visited or home user plane network element, to associate the data of the terminal on the user plane network element with data of the terminal on a visited or home session management network element, the data of the terminal on the visited or home user plane function network element further includes a third identifier. The third identifier includes an identifier allocated by the visited or home session management network element to a session of the terminal.

Figure 10A:
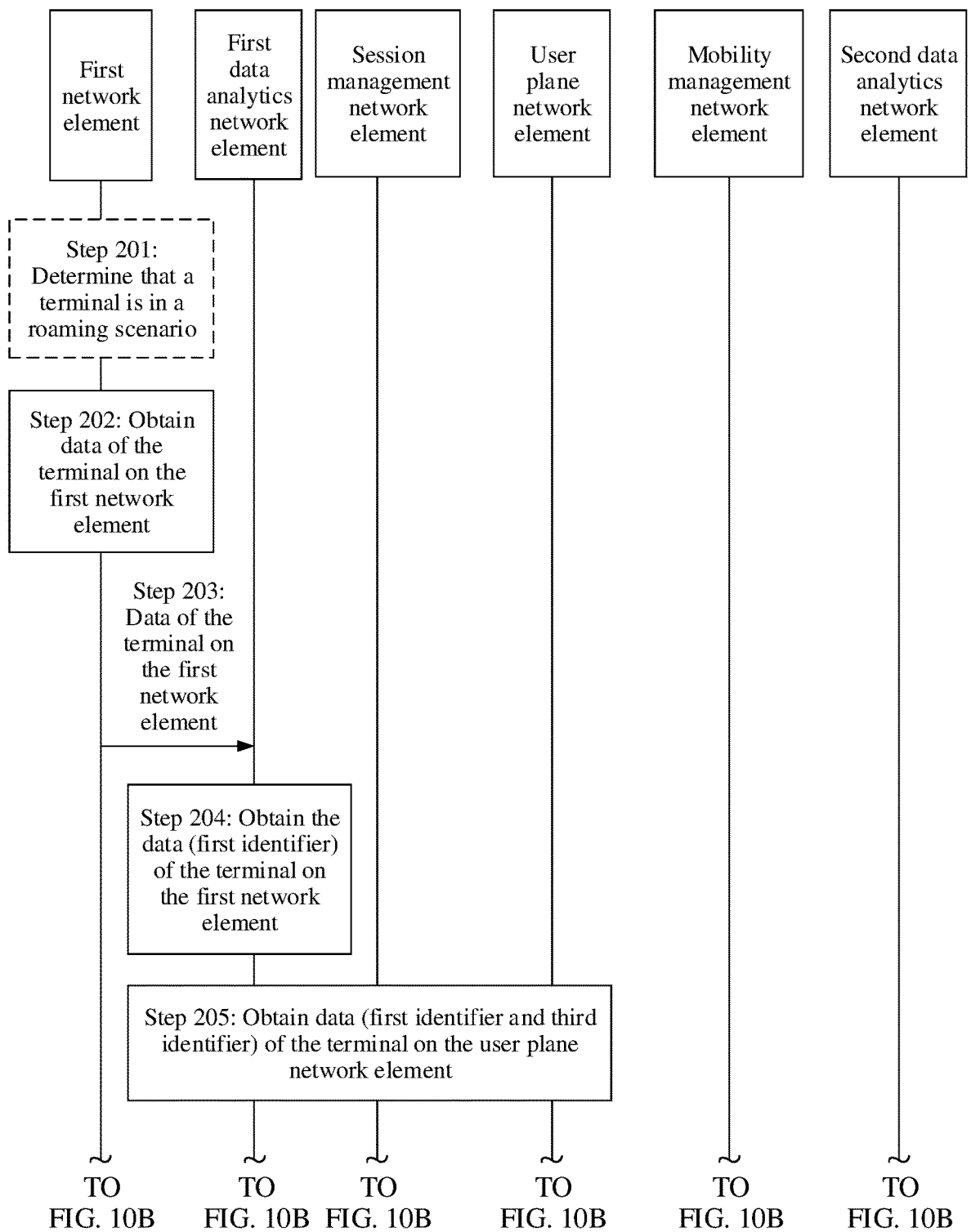
FIG. 10A, FIG. 10B, and FIG. 10C are example schematic flowcharts of still another roaming data processing method according to an embodiment of this application.
Figure 10B:
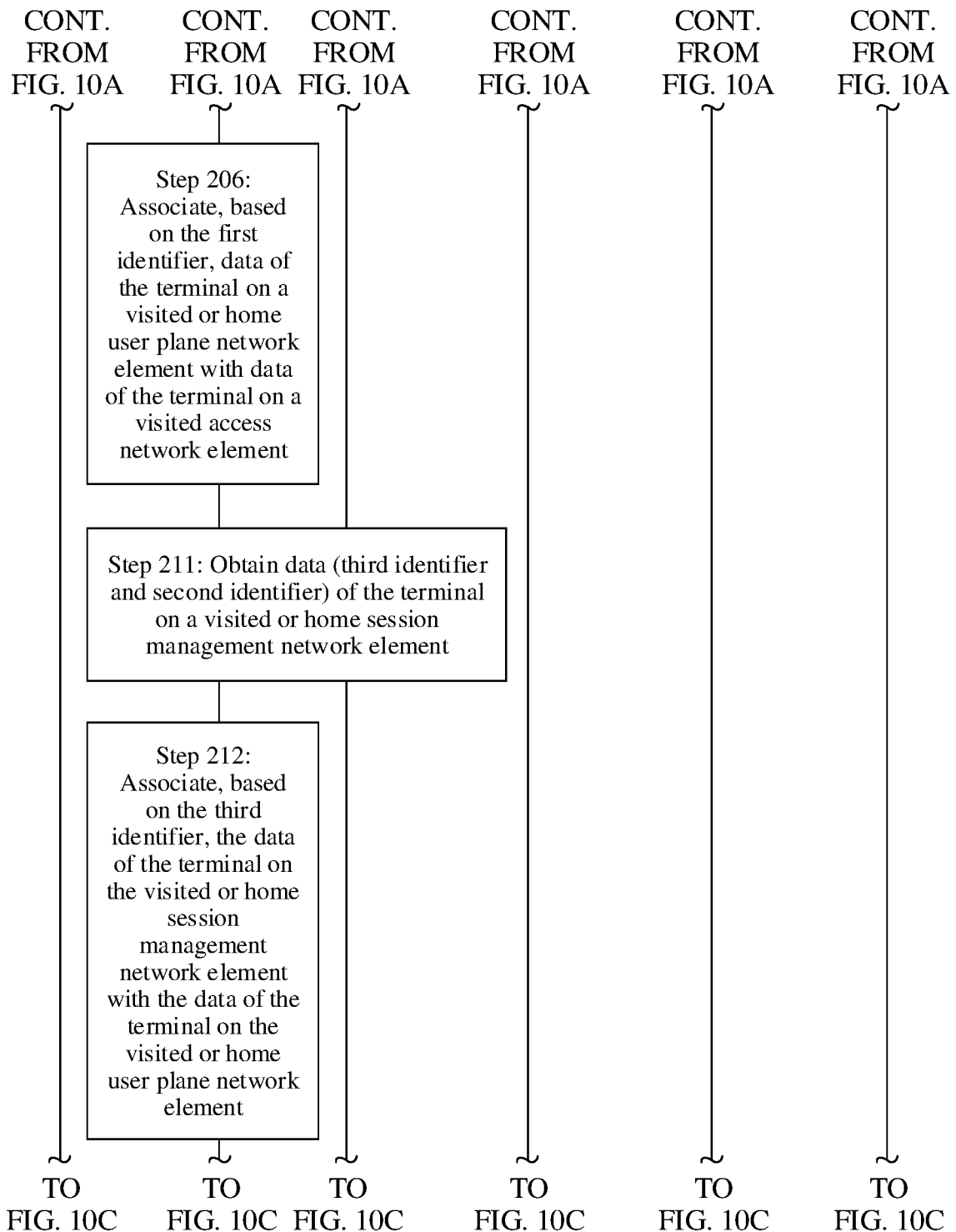
Figure 10C:
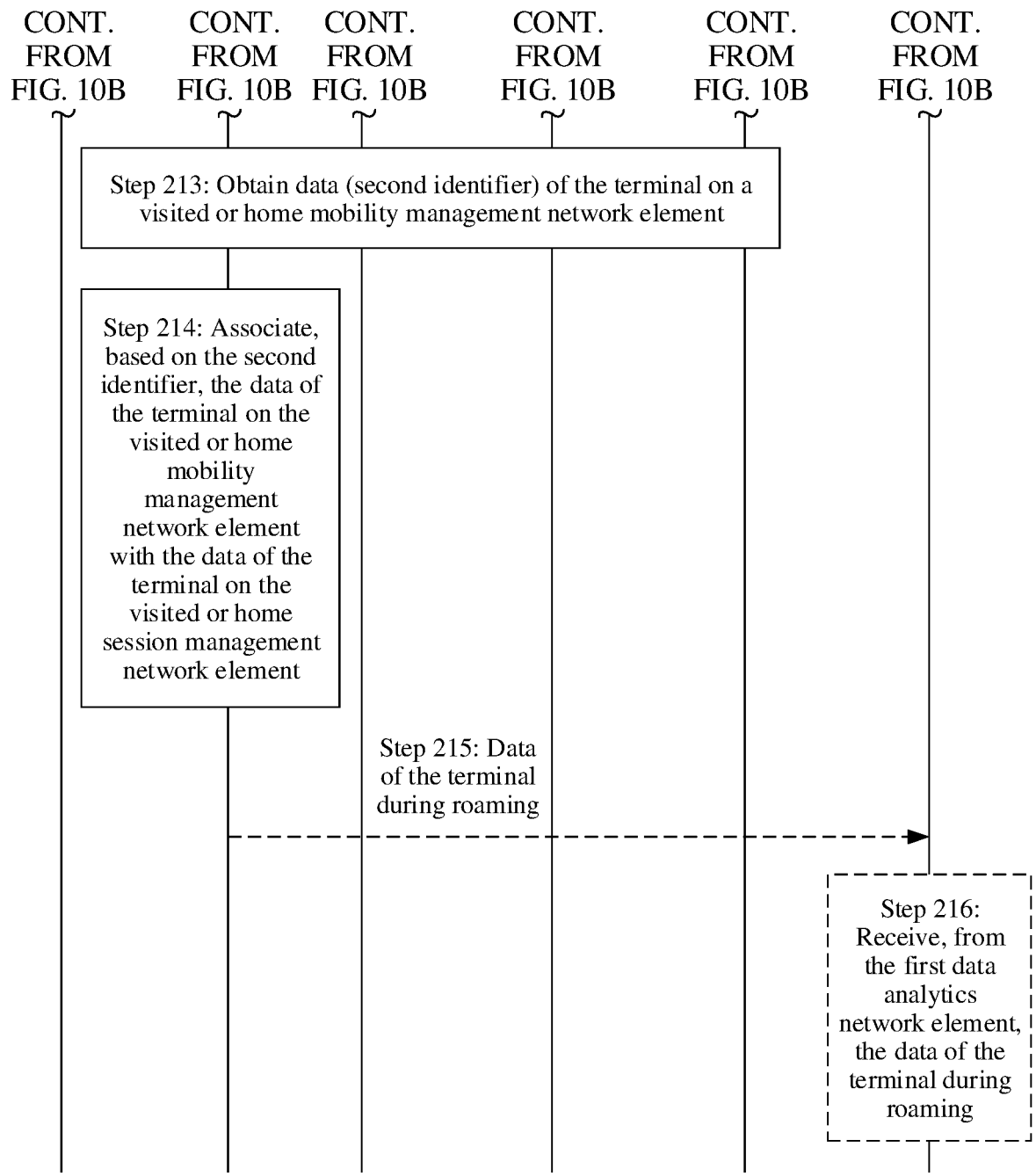

Correspondingly, with reference to step 201 to step 206, as shown in FIGS. 10A-C, the method provided in this embodiment of this application further includes the following steps.

Step 211: The first data analytics network element obtains the data of the terminal on the visited or home session management network element. The data of the terminal on the visited or home session management network element includes the third identifier.

Step 212: The first data analytics network element associates the data of the terminal on the visited or home session management network element with the data of the terminal on the visited or home user plane network element based on the third identifier.

In a possible implementation, the third identifier includes at least one of the following information: an identifier of the visited or home session management network element, the identifier of the visited or home user plane network element, the identifier of the terminal, an identifier of a session of the terminal, and an identifier of a flow of the terminal.

In a possible example, to further associate the data of the terminal on the visited or home session management network element with data of the terminal on a visited or home mobility management network element, the data of the terminal on the visited or home session management network element further includes: a second identifier. The second identifier includes a session management context identifier of the terminal.

Correspondingly, still with reference to FIGS. 10A-C, the method provided in this embodiment of this application further includes the following steps.

Step 213: The first data analytics network element obtains the data of the terminal on the visited or home mobility management network element. The data of the terminal on the visited or home mobility management network element includes the second identifier.

Step 214: The first data analytics network element associates the data of the terminal on the visited or home mobility management network element with the data of the terminal on the visited or home session management network element based on the second identifier.

In a possible implementation, the second identifier includes at least one of the following information: an identifier of the visited or home mobility management network element, an identifier of the visited or home session management network element, a CGI, the identifier of the terminal, and the identifier of the session of the terminal.

In an optional embodiment, as shown in FIGS. 10A-C, the method provided in this embodiment of this application further includes step 215: The first data analytics network element sends, to the second data analytics network element, the data of the terminal during roaming Step 216: The second data analytics network element receives, from the first data analytics network element, the data of the terminal during roaming. The data of the terminal during roaming includes the data obtained by the first data analytics network element by associating the network elements in step 201 to step 206 and step 211 to step 214.

It should be noted that for descriptions of the data of the terminal on each network element in step 201 to step 216, and related explanations of the first identifier, the second identifier, the third identifier, and the fourth identifier, refer to the related descriptions in step 101 to step 119.

It should be understood that the first data analytics network element can implement the foregoing association process 2 by using step 201 to step 206 and step 211 to step 214.

It should be noted that, in an embodiment in which the second network element is a visited or home user plane network element, for a process in which the first data analytics network element requests, from the second network element, the data of the terminal on the second network element, refer to the related descriptions in step 109 to step 110. For a process in which the second data analytics network element sends a second request message to the first data analytics network element, refer to the descriptions in the foregoing embodiment.

For example, in conclusion, the foregoing description is shown in Table 2. Table 2 shows a data association identifier.

TABLE 2

| Data association identifier | | | |
|---|---|---|---|
| Data source | Data (example) | ID | Remark |
| UE/ RAN | MDT data | Trace recording session reference | Mark MDT data of a terminal |
| | | AMF UE NGAP ID | AMF tunnel identifier that is on an N2 interface and that uniquely identifies a terminal |
| | | RAN UE NGAP ID | RAN tunnel identifier that is on an N2 interface and that uniquely identifies a terminal |
| | | CGI or RAN ID | Cell identifier or base station identifier, preventing repeated AMF UE NGAP IDs or RAN UE NGAP IDs on different AMFs or RANs |
| AMF network element | Location information of the terminal | AMF UE NGAP ID | AMF tunnel identifier that is on an N2 interface and that uniquely identifies a terminal |
| | | RAN UE NGAP ID | RAN tunnel identifier that is on an N2 interface and that uniquely identifies a terminal |
| | | SMF ID | The SM context ID is unique only in the SMF. Therefore, the SMF ID needs to be carried to uniquely identify a PDU session of the terminal on the entire network. |

TABLE 2-continued

| Data association identifier | | | |
|---|---|---|---|
| Data source | Data (example) | ID | Remark |
| | | AMF ID | Mandatory for data association. When a data analytics network element directly subscribes to the AMF network element for data of the terminal on the AMF network element, the data analytics network element knows an AMF ID. Therefore, the data reported by the AMF network element may not include this parameter. |
| | | UE ID | Identifier of a terminal |
| | | PDU session ID | Identify a PDU session of a terminal |
| | | SM context ID | =SUPI + PDU session ID, allocated by the SMF, used to identify a session of a network terminal when the AMF communicates with the SMF, and uniquely identifying a PDU session on a single SMF |
| SMF network element | Session data | UPF ID | Identify a UPF address corresponding to a session |
| | | ID of the SMF network element | Mandatory for data association. When an NWDAF directly subscribes to the SMF network element for the data of the terminal on the SMF network element, the NWDAF knows an AMF network element ID. Therefore, this parameter is optional. |
| | | UE ID | Identifier of a terminal |
| | | SM context ID | =SUPI + PDU session ID, allocated by the SMF network element, used to identify a session of a network terminal when the AMF network element communicates with the SMF network element, and uniquely identifying a PDU session on a single SMF network element |
| | | PDU session ID | Identify a session of a terminal. The identifier is unique in an SMF network element. |
| | | N4 session ID | Allocated by the SMF network element to identify the N4 session of a terminal |
| | | QoS flow ID | Identify a QoS flow (Note: One QoS flow may have a plurality of service flows, and each service flow is identified by an IP 5-tuple.) |
| UPF network element | Service QoS flow data | SMF ID | Identify an address of the SMF network element corresponding to a session |
| | | UPF ID | Mandatory for data association 1. If a data analytics network element directly subscribes to the UPF network element for the data of the terminal on the UPF network element, and the data analytics network element knows a UPF ID, the UPF network element may not carry the UPF network element ID when reporting the data. 2. If a data analytics network element subscribes to the data of the terminal on the UPF network element by using the SMF network element, the UPF network element needs to carry the UPF network element ID when reporting the data. |
| | | N4 session ID | Allocated by the SMF network element and used to identify an N4 session of a PDU session of a terminal |

TABLE 2-continued

| Data source | Data (example) | ID | Remark |
|---|---|---|---|
| | | Application ID or IP 3-tuple | Identify a service or a service server |
| | | QoS flow ID (QFI) | Identify a QoS flow |
| | | IP 5-tuple | Used to identify a service flow of a terminal |
| AF network element | Service data | Application ID or IP 3-tuple | Identify a service or a service server |
| | | IP 5-tuple | Used to identify a service flow of a terminal |
| | | UE ID | Identifier of a terminal |

It should be noted that, in a home routed roaming scenario, data of the terminal may be from visited network elements (a RAN, a V-AMF network element, a V-SMF network element, and a V-UPF network element), or may be from home network elements (an H-SMF and an H-UPF).

Example (A): The data of the terminal is finally analyzed by a visited data analytics network element.

(A1) The visited data analytics network element collects and associates data of the terminal on visited network elements, and a home data analytics network element collects and associates data of the terminal on home network elements. The home data analytics network element sends the associated data of the terminal on the home network elements to the visited data analytics network element, and the visited data analytics network element associates the data of the terminal on the visited network elements with the data of the terminal on the home network elements, to finally obtain the data of the terminal.

(A2) The visited data analytics network element collects data of the terminal on visited network elements, and a home data analytics network element collects data of the terminal on home network elements. The home data analytics network element sends the data of the terminal on the home network elements to the visited data analytics network element, and the visited data analytics network element associates the data of the terminal on the visited network elements with the data of the terminal on the home network elements, to finally obtain the data of the terminal.

(A3) The visited data analytics network element collects data of the terminal on visited network elements and data of the terminal on home network elements. The visited data analytics network element associates the data of the terminal on the visited network elements with the data of the terminal on the home network elements, to finally obtain the data of the terminal.

Example (B): The data is analyzed by a home data analytics network element.

(B1) The home data analytics network element collects and associates data of the terminal on home network elements, and a visited data analytics network element collects and associates data of the terminal on visited network elements. The visited data analytics network element sends the associated data of the terminal on the visited network elements to the home data analytics network element, and the home data analytics network element associates the data of the terminal on the visited network elements with the data of the terminal on the home network elements, to finally obtain the data of the terminal.

(B2) The home data analytics network element collects data of the terminal on home network elements, and a visited data analytics network element collects data of the terminal on visited network elements. The visited data analytics network element sends the data of the terminal on the visited network elements to the home data analytics network element, and the home data analytics network element associates the data of the terminal on the visited network elements with the data of the terminal on the home network elements, to finally obtain the data of the terminal.

(B3) The home data analytics network element collects data of the terminal on visited network elements and data of the terminal on home network elements. The home data analytics network element associates the data of the terminal on the visited network elements with the data of the terminal on the home network elements, to finally obtain the data of the terminal.

It should be noted that in the example (A) and the example (B), regardless of whether the data of the terminal is analyzed by the home data analytics network element or the visited data analytics network element, when the data of the terminal on the visited network elements and the data of the terminal on the home network elements are to be associated, the association needs to be performed by using an association identifier between a V-UPF network element and an H-UPF network element or between a V-SMF network element and an H-SMF network element. For example, association may be performed by using CN Tunnel Info (optionally, further including time and a network instance) between the V-UPF network element and the H-UPF network element, or by using an SUPI (or by using a V-SM context ID and time, optionally) between the V-SMF network element and the H-SMF network element.

It should be noted that, in a local breakout roaming scenario, the data of the terminal is from a visited network element.

Example (a): If the data is finally analyzed by a visited data analytics network element, the visited data analytics network element collects and associates data of the terminal on visited network elements, to finally obtain the data of the terminal.

Example (b): The data is finally analyzed by a home data analytics network element.

(b1) The visited data analytics network element may collect and associate data of the terminal on visited network elements to obtain the data of the terminal, and the visited data analytics network element sends the data of the terminal to the home data analytics network element.

(b2) The visited data analytics network element may collect data of the terminal on visited network elements, and the visited data analytics network element sends the data of the terminal on the visited network elements to the home data analytics network element. The home data analytics network element associates the data of the terminal on the visited network elements, to finally obtain the data of the terminal.

(b3) The home data analytics network element may directly collect data of the terminal on visited network elements from the visited network elements. The home data analytics network element associates the data of the terminal on the visited network elements, to finally obtain the data of the terminal.

The foregoing mainly describes the solutions in the embodiments of this application from a perspective of interaction between network elements. It may be understood that, to implement the foregoing functions, each network element such as the first data analytics network element, the second data analytics network element, the access network element, the user plane network element, the session management network element, the application network element, and the mobility management network element includes a corresponding hardware structure and/or software module for performing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, function unit division may be performed on the first data analytics network element, the second data analytics network element, the access network element, the user plane network element, the session management network element, the application network element, and the mobility management network element based on the foregoing method examples. For example, each function unit may be obtained through division corresponding to each function. Alternatively, two or more functions may be integrated into one processing unit. The integrated unit may be implemented in a form of hardware, or may be implemented in a form of a software functional unit. It should be noted that, in the embodiments of this application, division into the units is an example, and is merely a logical function division. In an actual implementation, another division manner may be used.

The methods in the embodiments of this application are described above with reference to FIG. 8A to FIG. 10C. The following describes roaming data processing apparatuses that perform the foregoing methods provided in the embodiments of this application. A person skilled in the art may understand that a method and an apparatus may be combined with and referenced to each other, and a roaming data processing apparatus provided in the embodiments of this application may perform the steps performed by the first data analytics network element, the second data analytics network element, the access network element, the user plane network element, the session management network element, the application network element, or the mobility management network element in the foregoing roaming data processing method.

An example in which each function module is obtained through division based on each corresponding function is used below for description.

Figure 11:
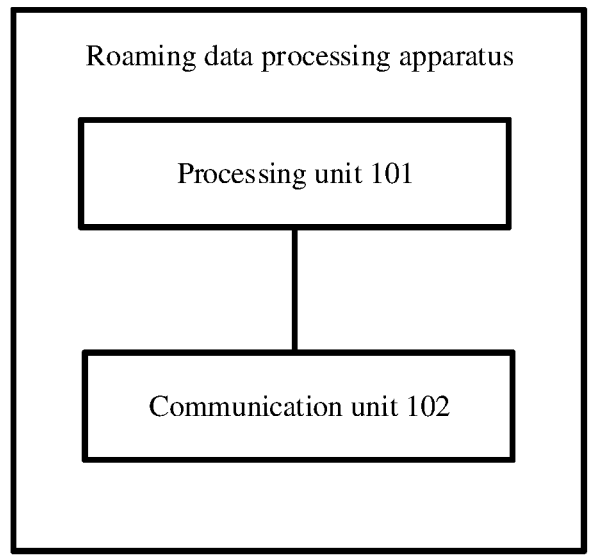
FIG. 11 is an example schematic diagram of a structure of a roaming data processing apparatus according to an embodiment of this application.

When an integrated unit is used, FIG. 11 shows a roaming data processing apparatus related to the foregoing embodiments. The roaming data processing apparatus may include a processing unit 101 and a communication unit 102.

For example, the roaming data processing apparatus is a first data analytics network element, or is a chip applied to the first data analytics network element. In this case, the communication unit 102 is configured to support the roaming data processing apparatus in performing step 104 and step 105 that are performed by the first data analytics network element in the foregoing embodiment. The processing unit 101 is configured to support the roaming data processing apparatus in performing step 106 performed by the first data analytics network element in the foregoing embodiment.

In a possible embodiment, the communication unit 102 is further configured to support the roaming data processing apparatus in performing step 107, step 109, step 112, step 114, step 116, and step 118 that are performed by the first data analytics network element in the foregoing embodiment. The processing unit 101 is further configured to support the roaming data processing apparatus in performing step 113, step 117, and step 119 that are performed by the first data analytics network element in the foregoing embodiment.

For another example, the roaming data processing apparatus is a first data analytics network element, or is a chip applied to the first data analytics network element. In this case, the communication unit 102 is configured to support the roaming data processing apparatus in performing step 204 and step 205 that are performed by the first data analytics network element in the foregoing embodiment. The processing unit 101 is configured to support the roaming data processing apparatus in performing step 206 performed by the first data analytics network element in the foregoing embodiment.

In a possible implementation, the communication unit 102 is further configured to support the roaming data processing apparatus in performing step 207, step 208, step 209, step 211, and step 213 that are performed by the first data analytics network element in the foregoing embodiment. The processing unit 101 is further configured to support the roaming data processing apparatus in performing step 208, step 212, and step 214 that are performed by the first data analytics network element in the foregoing embodiment.

In still another example, the roaming data processing apparatus is an access network element, or is a chip applied to the access network element. In this case, the processing unit 101 is configured to support the roaming data processing apparatus in performing step 101 and step 102 that are performed by the first network element in the foregoing embodiment. The communication unit 102 is configured to support the roaming data processing apparatus in performing step 103 performed by the first network element in the foregoing embodiment.

The communication unit 102 is further configured to support the roaming data processing apparatus in performing step 110 performed by the first network element in the foregoing embodiment.

In yet another example, the roaming data processing apparatus is an access network element, or is a chip applied to the access network element. In this case, the processing unit 101 is configured to support the roaming data processing apparatus in performing step 201 and step 202 that are performed by the first network element in the foregoing embodiment. The communication unit 102 is configured to support the roaming data processing apparatus in performing step 203 performed by the first network element in the foregoing embodiment.

It should be noted that in this embodiment of this application, the session management network element, the mobility management network element, the application network element, and the user plane network element may alternatively use a structure shown in FIG. 11. Specifically, for steps performed by any one of the session management network element, the mobility management network element, the application network element, and the user plane network element, refer to steps performed by the access network element.

The roaming data processing apparatus may further include a storage unit. The storage unit is configured to store computer program code, where the computer program code includes instructions. If the roaming data processing apparatus is a chip applied to the first data analytics network element, the session management network element, the mobility management network element, the application network element, or the user plane network element, the storage unit may be a storage unit (for example, a register or a cache) in the chip, or may be a storage unit (for example, a read-only memory and a random access memory) that is located outside the chip and in the first data analytics network element, the session management network element, the mobility management network element, the application network element, or the user plane network element.

Figure 12:
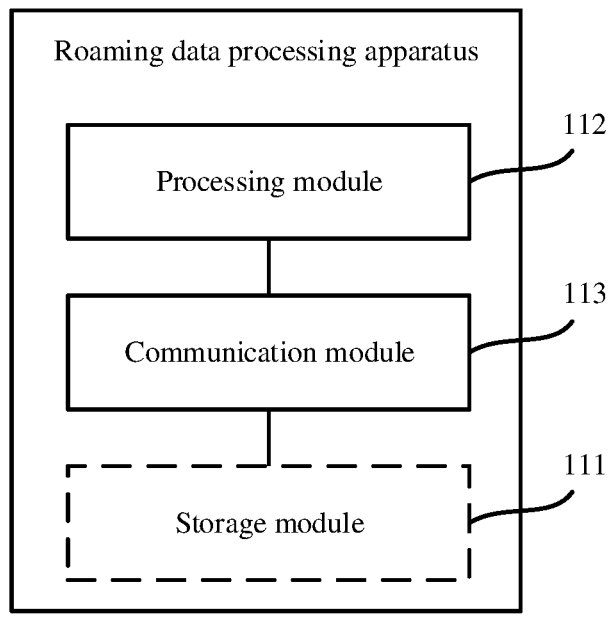
FIG. 12 is an example schematic diagram of a structure of another roaming data processing apparatus according to an embodiment of this application.

When an integrated unit is used, FIG. 12 is a possible schematic diagram of a logic structure of a roaming data processing apparatus related to the foregoing embodiments. The roaming data processing apparatus includes a processing module 112 and a communication module 113. The processing module 112 is configured to control and manage an action of the roaming data processing apparatus. For example, the processing module 112 is configured to perform a step of performing information/data processing in the roaming data processing apparatus. The communication module 113 is configured to support a step of sending or receiving information/data in the roaming data processing apparatus.

In a possible embodiment, the roaming data processing apparatus may further include a storage module 111, configured to store program code and data of the roaming data processing apparatus.

For example, the roaming data processing apparatus is a first data analytics network element, or is a chip applied to the first data analytics network element. In this case, the communication module 113 is configured to support the roaming data processing apparatus in performing step 104 and step 105 that are performed by the first data analytics network element in the foregoing embodiment. The processing module 112 is configured to support the roaming data processing apparatus in performing step 106 in the foregoing embodiment.

In a possible embodiment, the communication module 113 is further configured to support the roaming data processing apparatus in performing step 107, step 109, step 112, step 114, step 116, and step 118 that are performed by the first data analytics network element in the foregoing embodiment. The processing module 112 is further configured to support the roaming data processing apparatus in performing step 113, step 117, and step 119 that are performed by the first data analytics network element in the foregoing embodiment.

For example, the roaming data processing apparatus is a first data analytics network element, or is a chip applied to the first data analytics network element. In this case, the communication module 113 is configured to support the roaming data processing apparatus in performing step 204 and step 205 that are performed by the first data analytics network element in the foregoing embodiment. The processing module 112 is configured to support the roaming data processing apparatus in performing step 206 performed by the first data analytics network element in the foregoing embodiment.

In a possible embodiment, the communication module 113 is further configured to support the roaming data processing apparatus in performing step 207, step 206, step 208, step 209, step 211, and step 213 that are performed by the first data analytics network element in the foregoing embodiment. The processing module 112 is further configured to support the roaming data processing apparatus in performing step 208, step 212, and step 214 that are performed by the first data analytics network element in the foregoing embodiment.

In still another example, the roaming data processing apparatus is an access network element, or is a chip applied to the access network element. In this case, the processing module 112 is configured to support the roaming data processing apparatus in performing step 101 and step 102 that are performed by the first network element in the foregoing embodiment. The communication module 113 is configured to support the roaming data processing apparatus in performing step 103 performed by the first network element in the foregoing embodiment.

The communication module 113 is further configured to support the roaming data processing apparatus in performing step 110 performed by the first network element in the foregoing embodiment.

In yet another example, the roaming data processing apparatus is an access network element, or is a chip applied to the access network element. In this case, the processing module 112 is configured to support the roaming data processing apparatus in performing step 201 and step 202 that are performed by the first network element in the foregoing embodiment. The communication module 113 is configured to support the roaming data processing apparatus in performing step 203 performed by the first network element in the foregoing embodiment.

The processing module 112 may be a processor or a controller, for example, may be a central processing unit, a general purpose processor, a digital signal processor, an application-specific integrated circuit, a field-programmable gate array or another programmable logic device, a transistor logic device, a hardware component, or any combination thereof. The processing module may implement or execute various examples of logical blocks, modules, and circuits described with reference to content disclosed in the present technology. Alternatively, the processor may be a combination of processors implementing a computing function, for example, a combination of one or more microprocessors, or a combination of a digital signal processor and a microprocessor. The communication module 113 may be a transceiver, a transceiver circuit, a communication interface, or the like. The storage module 111 may be a memory.

Figure 13:
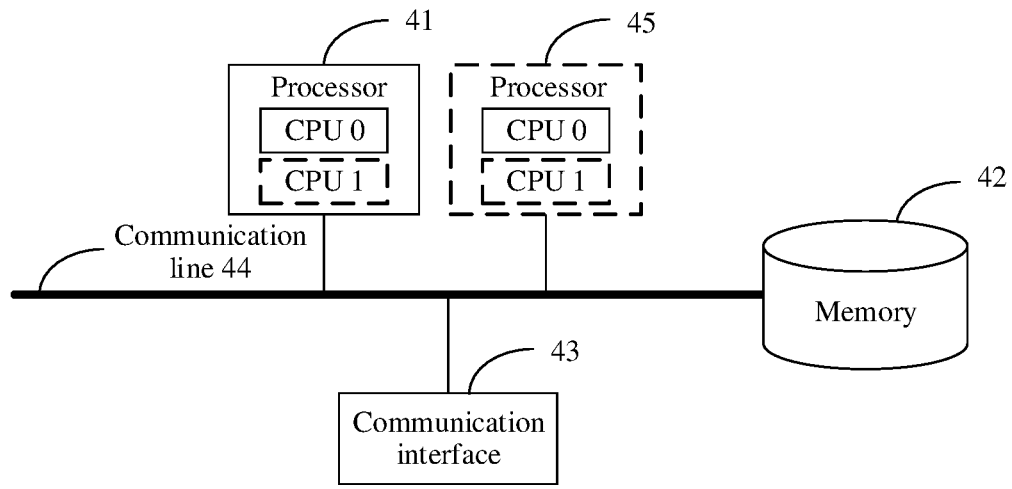
FIG. 13 is an example schematic diagram of a structure of a communication device according to an embodiment of this application.

When the processing module 112 is a processor 41 or a processor 45, the communication module 113 is a communication interface 43 or a transceiver, and the storage module 111 is a memory 42, the roaming data processing apparatus in this application may be a communication device shown in FIG. 13. The communication device includes a processor 41, a communication line 44, and at least one communication interface (descriptions are provided merely by using an example in which the communication device includes a communication interface 43 in FIG. 13).

Optionally, the communication device may further include a memory 42.

The processor 41 may be a general-purpose central processing unit (CPU), a microprocessor, an application-specific integrated circuit (ASIC), or one or more integrated circuits configured to control program execution of the solutions of this application.

The communication line 44 may include a path for transmitting information between the foregoing components (e.g., a bus).

The communication interface 43 is any apparatus such as a transceiver, and is configured to communicate with another device or a communication network such as the Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory may exist independently, and is connected to the processor through the communication line 44. The memory may alternatively be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement the roaming data processing methods provided in the foregoing embodiments of this application.

Optionally, the computer-executable instructions in the embodiments of this application may also be referred to as application program code. This is not specifically limited in the embodiments of this application.

During specific implementation, in an embodiment, the processor 41 may include one or more CPUs, such as a CPU 0 and a CPU 1 in FIG. 13.

During specific implementation, in an embodiment, the communication device may include a plurality of processors, such as the processor 41 and a processor 45 in FIG. 13. Each of the processors may be a single-core (single-CPU) processor, or may be a multi-core (multi-CPU) processor. Herein the processor may be one or more devices, circuits, and/or processing cores configured to process data (for example, a computer program instruction).

It should be understood that if the roaming data processing apparatus is an access network element, the communication interface 43 may be replaced by a transceiver.

Figure 14:
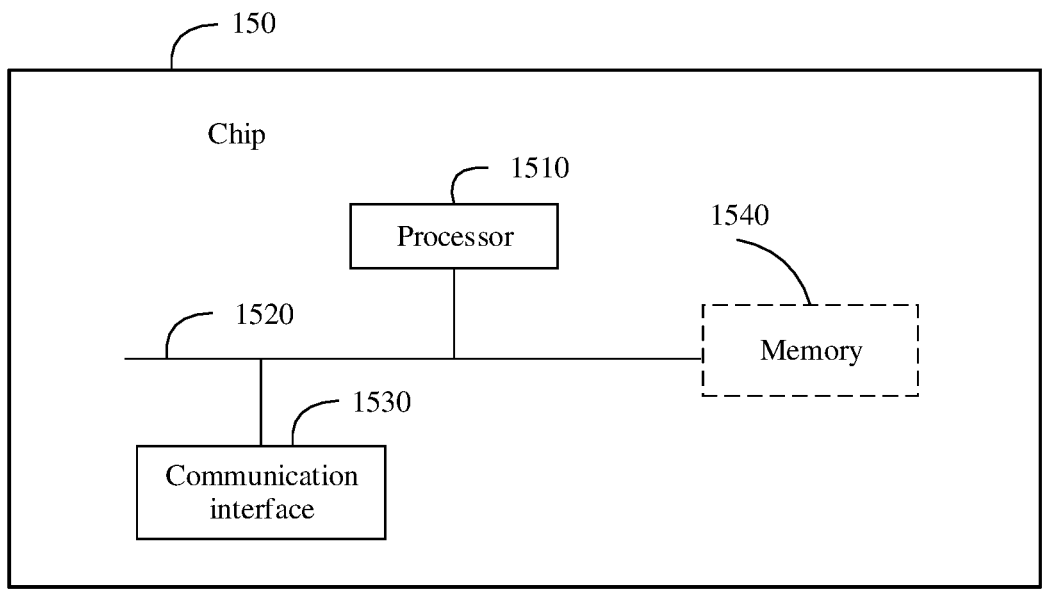
FIG. 14 is an example schematic diagram of a structure of a chip according to an embodiment of this application.

FIG. 14 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements: an execution module or a data structure, a subset thereof, or an extended set thereof.

In this embodiment of this application, a corresponding operation is performed by invoking the operation instructions (where the operation instructions may be stored in an operating system) stored in the memory 1540.

In a possible implementation, chips used by the first data analytics network element, the second data analytics network element, the access network element, the user plane network element, the application network element, the session management network element, and the mobility management network element have similar structures, and different apparatuses may use different chips to implement their respective functions.

The processor 1510 controls a processing operation of any one of the first data analytics network element, the second data analytics network element, the access network element, the user plane network element, the application network element, the session management network element, or the mobility management network element. The processor 1510 may also be referred to as a central processing unit (CPU).

The memory 1540 may include a read-only memory and a random access memory, and provide instructions and data for the processor 1510. A part of the memory 1540 may further include a non-volatile random access memory (NVRAM). For example, in application, the memory 1540, the communication interface 1530, and the memory 1540 are coupled together by using a bus system 1520. The bus system 1520 may include a power bus, a control bus, a status signal bus, and the like in addition to a data bus. However, for clear description, various types of buses in FIG. 14 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, steps in the foregoing method may be implemented by using a hardware integrated logical circuit in the processor 1510, or by using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor, or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform the receiving and sending steps of any one of the first data analytics network element, the second data analytics network element, the access network element, the user plane network element, the application network element, the session management network element, or the mobility management network element in the embodiments shown in FIG. 8A to FIG. 11. The processor 1510 is configured to perform processing steps of any one of the first data analytics network element, the second data analytics network element, the access network element, the user plane network element, the application network element, the session management network element, or the mobility management network element in the embodiments shown in FIG. 8A to FIG. 11.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from another chip or apparatus or send a signal.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

According to an aspect, a computer-readable storage medium is provided. The computer-readable storage medium stores instructions, and when the instructions are run, a first data analytics network element or a chip applied to the first data analytics network element is enabled to perform step 104, step 105, step 106, step 107, step 109, step 112, step 114, step 116, step 118, step 113, step 117, and step 119 in the embodiment.

According to another aspect, a computer-readable storage medium is provided. The computer-readable storage medium stores instructions, and when the instructions are run, a first data analytics network element or a chip applied to the first data analytics network element is enabled to perform step 204, step 205, step 206, step 207, step 208, step 209, step 211, step 213, step 212, and step 214 in the embodiment.

According to still another aspect, a computer-readable storage medium is provided. The computer-readable storage medium stores instructions, and when the instructions are run, an access network element or a chip applied to the access network element is enabled to perform step 101, step 102, step 103, and step 110 in the embodiment.

According to yet another aspect, a computer-readable storage medium is provided. The computer-readable storage medium stores instructions, and when the instructions are run, an access network element or a chip applied to the access network element is enabled to perform step 201, step 202, and step 203 in the embodiment.

The foregoing readable storage medium may include: any medium that can store program code, such as a universal serial bus (USB) flash drive, a removable hard disk, a read-only memory, a random access memory, a magnetic disk, or an optical disc.

According to an aspect, a computer program product including instructions is provided. The computer program product stores the instructions, and when the instructions are run, a first data analytics network element or a chip applied to the first data analytics network element is enabled to perform step 104, step 105, step 106, step 107, step 109, step 112, step 114, step 116, step 118, step 113, step 117, and step 119 in the embodiment.

According to another aspect, a computer program product including instructions is provided. The computer program product stores the instructions, and when the instructions are executed, a first data analytics network element or a chip applied to the first data analytics network element is enabled to perform step 204, step 205, step 206, step 207, step 208, step 209, step 211, step 213, step 212, and step 214 in the embodiment.

According to still another aspect, a computer program product including instructions is provided. The computer program product stores the instructions. When the instructions are run, an access network element or a chip applied to the access network element is enabled to perform step 101, step 102, step 103, and step 110 in the embodiment.

According to yet another aspect, a computer program product including instructions is provided. The computer program product stores the instructions. When the instructions are run, an access network element or a chip applied to the access network element is enabled to perform step 201, step 202, and step 203 in the embodiment.

According to an aspect, a chip is provided. The chip is applied to a first data analytics network element. The chip includes at least one processor and a communication interface, the communication interface is coupled to the at least one processor, and the processor is configured to run instructions, to perform step 104, step 105, step 106, step 107, step 109, step 112, step 114, step 116, step 118, step 113, step 117, and step 119 in the embodiment.

According to another aspect, a chip is provided. The chip is applied to a first data analytics network element. The chip includes at least one processor and a communication interface, the communication interface is coupled to the at least one processor, and the processor is configured to run instructions, to perform step 204, step 205, step 206, step 207, step 208, step 209, step 211, step 213, step 212, and step 214 in this embodiment.

According to an aspect, a chip is provided. The chip is applied to an access network element. The chip includes at least one processor and a communication interface, the communication interface is coupled to the at least one processor, and the processor is configured to run instructions, to perform step 101, step 102, step 103, and step 110 in the embodiment.

According to another aspect, a chip is provided. The chip is applied to an access network element. The chip includes at least one processor and a communication interface, the communication interface is coupled to the at least one processor, and the processor is configured to run instructions, to perform step 201, step 202, and step 203 in the embodiment.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and accompanying drawings are merely example description of this application defined by the appended claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A roaming data processing method, comprising:
    receiving, by a first data analytics network element from a visited first network element, data of a terminal on the visited first network element, wherein the data comprises first information and a first identifier, the first information indicates that the terminal is roaming, and the first information comprises any one or more of: a home public land mobile network (PLMN) identifier, a visited PLMN identifier, home area information, and visited area information;
    receiving, by the first data analytics network element from a second network element, data of the terminal on the second network element, wherein the data of the terminal on the second network element comprises the first identifier, wherein the first identifier is used for associating the data of the terminal on the visited first network element with the data of the terminal on the second network element; and
    associating, by the first data analytics network element based on the first identifier, the data of the terminal on the visited first network element with the data of the terminal on the second network element, to obtain data of the terminal during roaming.

2. The method according to claim 1, wherein the first information further comprises:
    a roaming scenario of a session of the terminal, wherein the roaming scenario includes home routed or local breakout.

3. The method according to claim 1, wherein the first identifier comprises:
    an identifier of the visited first network element, an identifier of the second network element, an identifier allocated by the visited first network element to the terminal, an identifier allocated by the second network element to the terminal, an identifier of the terminal, an identifier of the session of the terminal, a session management context identifier of the terminal, an identifier of a flow of the terminal, an internet protocol (IP) 5-tuple, network instance information, and area information of the terminal.

4. The method according to claim 1, wherein the second network element includes a visited second network element or a home second network element.

5. The method according to claim 1, further comprising:
    sending, by the first data analytics network element to a second data analytics network element, the data of the terminal during roaming.

6. The method according to claim 5, wherein the first data analytics network element includes a visited data analytics network element, and the second data analytics network element includes a home data analytics network element.

7. The method according to claim 5, wherein the first data analytics network element includes a home data analytics network element, and the second data analytics network element includes a visited data analytics network element.

8. The method according to claim 1, further comprising:
    determining, by the visited first network element, that the terminal is roaming;
    obtaining, by the visited first network element, the data of the terminal on the visited first network element; and
    sending, by the visited first network element, the data of the terminal on the visited first network element to the first data analytics network element.

9. An apparatus associated with a first data analytics network element, the apparatus comprising:
    a processor; and
    a memory configured to store computer readable instructions that, when executed by the processor, cause the apparatus to:
        receive, from a visited first network element, data of a terminal on the visited first network element, wherein the data comprises first information and a first identifier, the first information indicates that the terminal is roaming, and the first information comprises any one or more of: a home public land mobile network (PLMN) identifier, a visited PLMN identifier, home area information, and visited area information;

receive, from a second network element, data of the terminal on the second network element, wherein the data of the terminal on the second network element comprises the first identifier, wherein the first identifier is used for associating the data of the terminal on the visited first network element with the data of the terminal on the second network element; and associate, based on the first identifier, the data of the terminal on the visited first network element with the data of the terminal on the second network element, to obtain data of the terminal during roaming.

10. The apparatus according to claim 9, wherein the first information further comprises:
a roaming scenario of a session of the terminal, wherein the roaming scenario includes home routed or local breakout.

11. The apparatus according to claim 9, wherein the first identifier comprises:
an identifier of the visited first network element, an identifier of the second network element, an identifier allocated by the visited first network element to the terminal, an identifier allocated by the second network element to the terminal, an identifier of the terminal, an identifier of the session of the terminal, a session management context identifier of the terminal, an identifier of a flow of the terminal, an internet protocol (IP) 5-tuple, network instance information, and area information of the terminal.

12. The apparatus according to claim 9, wherein the second network element includes a visited second network element or a home second network element.

13. The apparatus according to claim 9, wherein the apparatus is further caused to:
send the data of the terminal during roaming to a second data analytics network element.

14. The apparatus according to claim 13, wherein the first data analytics network element includes a visited data analytics network element, and the second data analytics network element includes a home data analytics network element.

15. The apparatus according to claim 13, wherein the first data analytics network element includes a home data analytics network element, and the second data analytics network element includes a visited data analytics network element.

16. A non-transitory computer readable storage medium, storing one or more programs, the one or more programs comprise instructions which, when executed by a processor of an apparatus associated with a first data analytics network element, cause the apparatus to provide execution comprising:

receiving, from a visited first network element, data of a terminal on the visited first network element, wherein the data comprises first information and a first identifier, the first information indicates that the terminal is roaming, and the first information comprises any one or more of: a home public land mobile network (PLMN) identifier, a visited PLMN identifier, home area information, and visited area information;

receiving, from a second network element, data of the terminal on the second network element, wherein the data of the terminal on the second network element comprises the first identifier, wherein the first identifier is used for associating the data of the terminal on the visited first network element with the data of the terminal on the second network element; and associating, based on the first identifier, the data of the terminal on the visited first network element with the data of the terminal on the second network element, to obtain data of the terminal during roaming.

17. The non-transitory computer readable storage medium according to claim 16, wherein the first information further comprises:
a roaming scenario of a session of the terminal, wherein the roaming scenario includes home routed or local breakout.

18. The non-transitory computer readable storage medium according to claim 16, wherein the first identifier comprises:
an identifier of the visited first network element, an identifier of the second network element, an identifier allocated by the visited first network element to the terminal, an identifier allocated by the second network element to the terminal, an identifier of the terminal, an identifier of the session of the terminal, a session management context identifier of the terminal, an identifier of a flow of the terminal, an internet protocol (IP) 5-tuple, network instance information, and area information of the terminal.

19. The non-transitory computer readable storage medium according to claim 16, wherein the second network element includes a visited second network element or a home second network element.

20. The non-transitory computer readable storage medium according to claim 16, wherein the apparatus is further caused to provide execution comprising sending, to a second data analytics network element, the data of the terminal during roaming.

* * * * *